(12) United States Patent
Hendricks et al.

(10) Patent No.: US 7,343,614 B1
(45) Date of Patent: Mar. 11, 2008

(54) PROGRAM DELIVERY SYSTEM FOR VOD

(75) Inventors: John S. Hendricks, Potomac, MD (US); Richard E. Wunderlich, Alpharetta, GA (US)

(73) Assignee: Sedna Patent Services, LLC, Philadelphia, PA (US)

(*) Notice: Subject to any disclaimer, the term of this patent is extended or adjusted under 35 U.S.C. 154(b) by 0 days.

(21) Appl. No.: 09/285,249

(22) Filed: Apr. 2, 1999

Related U.S. Application Data

(63) Continuation of application No. 08/352,205, filed on Dec. 2, 1994, now Pat. No. 6,201,536, which is a continuation-in-part of application No. 08/160,280, filed on Dec. 2, 1993, now Pat. No. 5,600,364, which is a continuation-in-part of application No. 07/991,074, filed on Dec. 9, 1992, and a continuation-in-part of application No. 08/160,282, filed on Dec. 2, 1993, now Pat. No. 5,659,350, which is a continuation-in-part of application No. 08/160,193, filed on Dec. 2, 1993, now Pat. No. 5,734,853, which is a continuation-in-part of application No. 08/160,194, filed on Dec. 2, 1993, now Pat. No. 5,990,927, and a continuation-in-part of application No. 08/160,283, filed on Dec. 2, 1993, now Pat. No. 5,682,195.

(51) Int. Cl.
*H04N 7/16* (2006.01)
*H04N 7/167* (2006.01)
*H04N 7/173* (2006.01)

(52) U.S. Cl. ............................... 725/8; 725/31; 725/93

(58) Field of Classification Search ............ 725/91–96, 725/87, 114, 116, 86, 104, 115, 8, 31; 709/217, 709/218, 219, 104, 87, 86, 92, 95, 96, 115; *H04N 7/16, H04N 7/173*
See application file for complete search history.

(56) References Cited

U.S. PATENT DOCUMENTS

| 4,225,884 A | * | 9/1980 | Block et al. ............... 380/233 |
|---|---|---|---|
| 4,677,685 A | * | 6/1987 | Kurisu ........................ 725/151 |
| 4,686,564 A | * | 8/1987 | Masuko et al. .............. 725/120 |
| 4,975,951 A | | 12/1990 | Bennett ...................... 380/231 |
| 5,245,420 A | * | 9/1993 | Harney et al. .............. 725/104 |
| 5,247,347 A | | 9/1993 | Litteral et al. .............. 725/114 |
| 5,270,809 A | | 12/1993 | Gammie et al. |
| 5,285,272 A | | 2/1994 | Bradley et al. ............. 725/115 |
| 5,317,391 A | | 5/1994 | Banker et al. |
| 5,357,276 A | * | 10/1994 | Banker et al. .............. 725/102 |
| 5,367,330 A | | 11/1994 | Haave ........................ 725/104 |
| 5,374,951 A | | 12/1994 | Welsh |
| 5,467,402 A | | 11/1995 | Okuyama et al. |
| 5,477,263 A | | 12/1995 | O'Callaghan ............... 725/102 |
| 5,479,508 A | | 12/1995 | Bestler et al. .............. 380/240 |
| 5,512,934 A | | 4/1996 | Kochanski ................... 725/97 |
| 5,550,863 A | | 8/1996 | Yurt et al. |
| 5,631,693 A | * | 5/1997 | Wunderlich et al. .......... 725/91 |
| 5,635,989 A | | 6/1997 | Rothmuller |

(Continued)

FOREIGN PATENT DOCUMENTS

WO    WO 89/09528    10/1989

OTHER PUBLICATIONS

A.D. Gelman, et al.; A Store-and-Forward Architecture for Video-on-Demand Service; 1991; pp. 842-846.

*Primary Examiner*—Andrew Y Koenig
(74) *Attorney, Agent, or Firm*—Patterson & Sheridan, LLP

(57) ABSTRACT

A novel network manager for use with a cable television system headend capable of monitoring and managing headend components and set top terminals in a television delivery system. The invention relates to methods and apparatus that manage and coordinate the reception of requested video on demand programs. The invention manages and coordinates the storage of the requested video on demand programs for intelligent selection and distribution to set top terminals

23 Claims, 17 Drawing Sheets

U.S. PATENT DOCUMENTS

| | | |
|---|---|---|
| 5,715,315 A | 2/1998 | Handelman |
| 5,818,511 A * | 10/1998 | Farry et al. ................. 725/116 |
| 5,833,468 A | 11/1998 | Guy et al. |
| 5,917,537 A | 6/1999 | Lightfoot et al. |
| 6,201,536 B1 * | 3/2001 | Hendricks et al. .......... 345/716 |
| 6,331,877 B1 | 12/2001 | Bennington et al. |

* cited by examiner

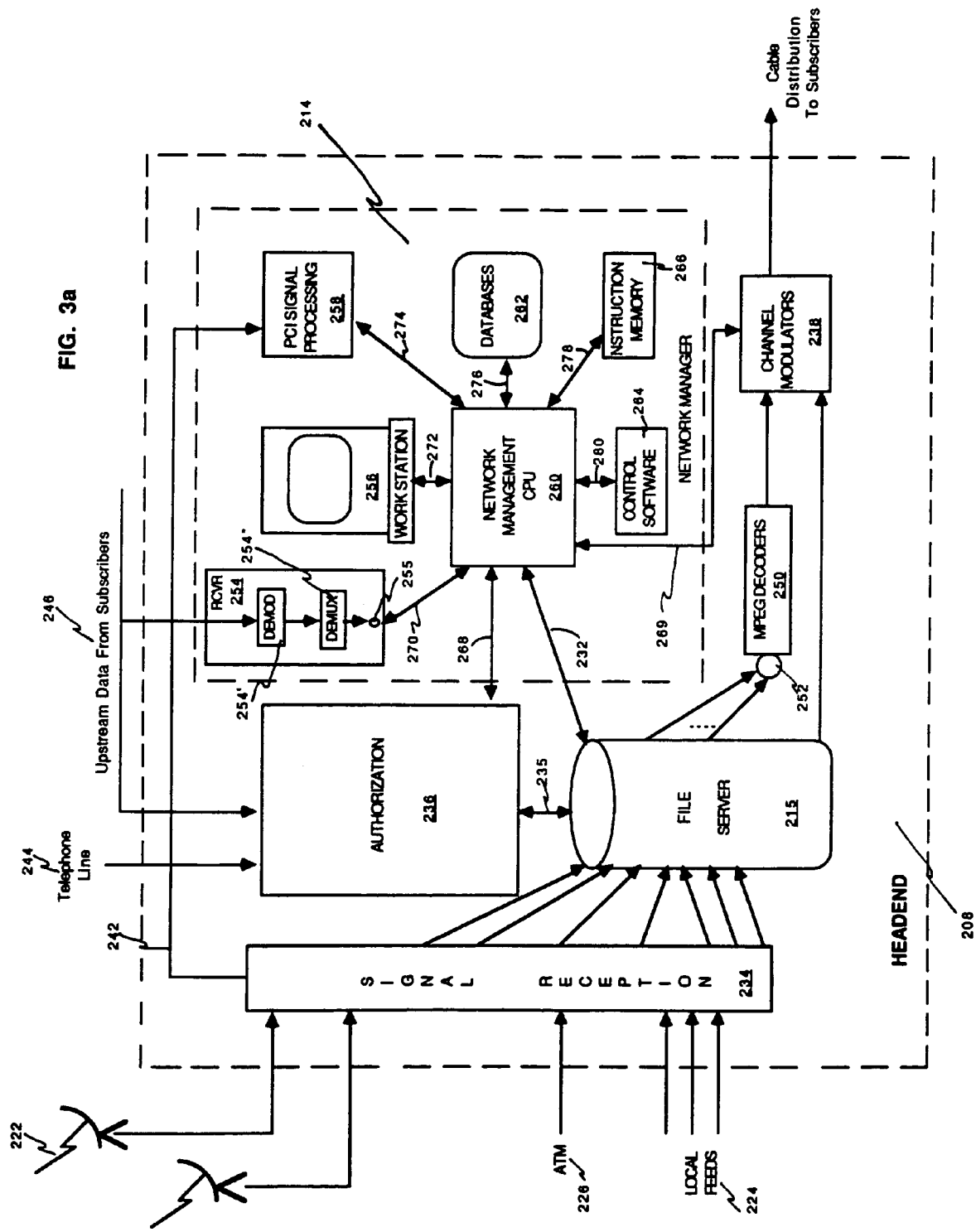

MONTHLY PROGRAMS WATCHED MATRIX

PROGRAM CATEGORIES

| TIME SLOT | SPORTS | NEWS | MOVIES | CHILDREN | ENTERTAINMENT |
|---|---|---|---|---|---|
| 0000-0400 | 0 | 2 | 2 | 0 | 0 |
| 0400-0800 | 0 | 2 | 0 | 3 | 0 |
| 0800-1200 | 2 | 0 | 10 | 2 | 6 |
| 1200-1600 | 20 | 1 | 3 | 5 | 4 |
| 1600-2200 | 8 | 6 | 13 | 0 | 5 |
| 2000-2400 | 0 | 10 | 2 | 4 | 2 |

FIG. 9

| Interactive Question / Program Number | I | II | III | IV | V | VI | VII | VIII | IX | X |
|---|---|---|---|---|---|---|---|---|---|---|
| Program No. 1 | A\|B / C\|D | A/B | A\|B / C\|D | A\|B / C\|D | A\|B\|C | A\|B / C\|D | A\|B\|C | A\|B / C\|D | A/B | A\|B / C\|D |
| Program No. 2 | A\|B / C\|D | A\|B\|C | A\|B / C\|D | A/B | A\|B / C\|D | A/B | A\|B / C\|D | A\|B / C\|D | A\|B / C\|D | A\|B\|C |
| Program No. 3 | A/B | A\|B / C\|D | A\|B\|C | A/B | A/B | A\|B / C\|D | A\|B\|C | A\|B / C\|D | A\|B / C\|D | A/B |
| Program No. 4 | A\|B / C\|D | A\|B\|C | A\|B / C\|D | A/B | A\|B / C\|D | A\|B\|C | A\|B / C\|D | A\|B / C\|D | A/B | A\|B / C\|D |
| Program No. 5 | A\|B\|C | A\|B / C\|D | A/B | A\|B / C\|D | A\|B / C\|D | A\|B / C\|D | A\|B / C\|D | A\|B / C\|D | A\|B / C\|D | A\|B / C\|D |
| Program No. 6 | A/B | A\|B / C\|D | A\|B / C\|D | A/B | A/B | A/B | A\|B / C\|D | A\|B / C\|D | A\|B\|C | A\|B / C\|D |
| Program No. 7 | A\|B / C\|D | A\|B / C\|D | A\|B\|C | A\|B\|C | A\|B / C\|D | A\|B\|C | A\|B / C\|D | A\|B\|C | A\|B / C\|D | A/B |
| Program No. 8 | A\|B / C\|D | A/B | A\|B / C\|D | A\|B\|C | A\|B / C\|D | A\|B / C\|D | A\|B / C\|D | A/B | A\|B / C\|D | A\|B / C\|D |

FIG. 11

PROGRAM DELIVERY SYSTEM FOR VOD

RELATED APPLICATIONS

This application is a continuation application of application Ser. No. 08/352,205, filed Dec. 2, 1994, now U.S. Pat. No. 6,201,536 entitled NETWORK MANAGER FOR CABLE TELEVISION SYSTEM HEADENDS, which is a continuation-in-part of U.S. patent application Ser. No. 08/160,280 filed Dec. 2, 1993, now U.S. Pat. No. 5,600,364, entitled NETWORK CONTROLLER FOR CABLE TELEVISION DELIVERY SYSTEM and U.S. patent application Ser. No. 08/160,281, now U.S. Pat. No. 5,798,785, entitled TERMINAL FOR SUGGESTING PROGRAMS OFFERED ON A TELEVISION PROGRAM DELIVERY SYSTEM, filed Dec. 2, 1993, which are a continuation-in-part applications of Ser. No. 07/991,074, filed Dec. 9, 1992, entitled TELEVISION PROGRAM PACKAGING AND DELIVERY SYSTEM WITH MENU DRIVEN SUBSCRIBER ACCESS.

This application is also a continuation-in-part of U.S. Ser. No. 08/160,194, now U.S. Pat. No. 5,990,927 filed Dec. 2, 1993 entitled ADVANCED SET-TOP TERMINAL FOR CABLE TELEVISION DELIVERY SYSTEMS, U.S. Ser. No. 08/160,283 now U.S. Pat. No. 5,682,195 filed Dec. 2, 1993 entitled DIGITAL CABLE HEADEND FOR CABLE TELEVISION, U.S. Ser. No. 08/160,282, now U.S. Pat. No. 5,659,350 filed Dec. 2, 1993 entitled AN OPERATIONS CENTER FOR A TELEVISION PROGRAM PACKAGING AND DELIVERY SYSTEM AND U.S. Ser. No. 08/160,193, now U.S. Pat. No. 5,734,853 filed on Dec. 2, 1993 entitled SET-TOP TERMINAL FOR CABLE TELEVISION DELIVERY SYSTEMS.

All the above identified applications are incorporated by reference herein. This application also incorporates by reference, U.S. Pat. No. 5,559,549, filed Dec. 2, 1993, entitled TELEVISION PROGRAM DELIVERY SYSTEM; and U.S. Pat. No. 5,600,573, filed Dec. 2, 1994, entitled AN OPERATIONS CENTER WITH VIDEO STORAGE OF A TELEVISION PROGRAM PACKAGING AND DELIVERY SYSTEM.

TECHNICAL FIELD

The invention relates to cable television delivery systems for providing television programming to consumer homes. More particularly, the invention relates to a network manager that coordinates, monitors, and manages a television program delivery network from a cable headend.

BACKGROUND ART

Advances in television entertainment have been primarily driven by breakthroughs in technology. In 1939, advances on Vladmir Zworykin's picture tube provided the stimulus for NBC to begin its first regular broadcasts. In 1975, advances in satellite technology provided consumers with increased programming to homes.

Many of these technology breakthroughs have produced inconvenient systems for consumers. One example is the ubiquitous three remote control home, having a separate and unique remote control for the TV, cable box and VCR. More recently, technology has provided cable users in certain parts of the country with 100 channels of programming. This increased program capacity is beyond the ability of many consumers to use effectively. No method of managing the program choices has been provided to consumers.

Consumers are demanding that future advances in television entertainment, particularly programs and program choices, be presented to the consumer in a user friendly manner. In order for new television entertainment products to be successful, the products must satisfy consumer demands. TV consumers wish to go from limited viewing choices to a variety of choices, from no control of programming to complete control. Consumers wish to advance from cumbersome and inconvenient television to each and convenient television and keep costs down. Consumers do not wish to pay for one hundred channels when due to lack of programming information, they seldom, if ever, watch programming on many of these channels. Viewers wish their programming to be customized and targeted to their needs and tastes.

The concepts of interactive television, high definition television and 300 channel cable systems in consumer homes will not sell if they are not managed, packaged, delivered and presented in a usable fashion to consumers. Consumers are already being bombarded with programming options, numerous "free" cable channels, subscription cable channels and pay-per-view choices. Any further increase in TV entertainment choices, without a managed user friendly presentation and approach, will likely bewilder viewers with a mind-numbing array of choices.

The TV industry has traditionally marketed and sold its programs to consumers in bulk, such as continuous feed broadcast and long-term subscriptions to movie channels. The TV industry is unable to sell its programming in large quantities on a unit per unit basis, such as the ordering of one program. Consumers prefer a unit sales approach because it keeps costs down and allows the consumer to be more selective in their viewing.

In today's television world, networks manage the program lineup for individual channels. Each network analyzes ratings for television shows and determines the appropriate schedule or program lineup to gain market share and revenue from advertising. Since each channel is in competition with every other channel, there is no coordinated effort to manage television programming in a manner that primarily suits the viewers.

Advertising has become equally annoying, with viewers being "forced" to watch television commercials for goods and services that are neither needed nor desired. As a result, consumers have become impatient and dissatisfied with today's television delivery systems. Equally problematic, these television delivery systems do not have the capabilities or features necessary to operate in the digital environment. Consequently, advances in digital signal technology call for a new television program delivery system that is capable of satisfying varying consumer and viewer needs.

Existing cable headends are unequipped for the transition to a digital system. These cable headends have no means for monitoring and managing the large numbers of program signals and advertisements that will eventually be passed on to both consumers and viewers. These cable headends are not able to provide menus to viewers or to suggest programs to viewers. These cable headends are unequipped to manage account and billing information for set top terminals without relying on telephone lines. In addition, these cable headends have no means for targeting advertisements to particular consumers and viewers.

SUMMARY OF INVENTION

The present invention is a network manager for a television delivery system. The network manager is the central component that provides monitoring and management of headend components and set top terminals in a television delivery system. The network manager is a key component of a cable television delivery system with upstream subscriber communications. The network manager of the present invention provides much greater flexibility and capability than existing cable headend management, monitoring and control equipment.

The network manager of the preferred embodiment performs all of its cable network monitoring, management and control of cable headend components and set top terminals from the cable headend. The cable headend may receive digital or analog signals over satellite or terrestrial link. Signals are processed and stored by a file server for subsequent selection and distribution over the cable television system to subscribers. The selection and distribution of stored programs, menus, advertisements, video, data and the like is accomplished intelligently using the network manager.

The primary function of the network manager is to operate with other cable headend components in order to manager and coordinate the reception of various programming and control signals and store such signals for intelligent selection and distribution to set top terminals. In so doing, the network manager oversees signals reception, processing, storage, intelligent selection and distribution of signals and data to subscribers.

The network manager performs its functions and processing capabilities using several components. These components include a receiver or set of receivers (including a demodulator, demultiplexer and/or buffering circuitry), a work station, a program control information processing component, a network management CPU, databases, control software and an instruction memory. Using these components, the network manager works with other cable headend components, including signal reception equipment, an authorization component, a file server, MPEG decoders, a digital buffer with frame repeat and channel modulators The network manager is capable of processing upstream information and subscriber communications received from the set top terminals, whether such information is received via telephone or upstream over the cable system. With these capabilities, the network manger can oversee and perform various system services, including (1) near video on demand (NVOD), (2) virtual video on demand (VVOD), (3) video on demand (VOD), (4) interactive program services, (5) program suggestion features and capabilities, (6) advertisement targeting, (7) generation of standard and customer menus, and (8) data spooling and text overlaying. The network manager may accommodate additional services such as account and billing processing. In addition, the network manager may operate with different types of set top terminals, including both digital and analog set top terminals.

The network manager makes use of a number of software routines in performing its major functions. The routines operate at different processing levels within the network manager's software hierarchy to: identify a subscriber request, process the subscriber's request, locate the data corresponding to the subscriber's request, and send the data located to the subscriber.

The network manager makes use of a Reception routine to designate the type of subscriber communication received by the network manager. Typically, the routine designates the subscriber communication as either a program request or menu request.

A Program Request routine can be used for all subscriber communications that are program related. The Program Request routine identifies the type of program request in real-time as a NVOD program request, a VVOD program request, an interactive program request, and/or a request that may be used in the targeting of advertisements.

A Menu Request routine can be used to identify menu requests. This routine identifies the type of menu in real-time as a standard menu or a custom menu.

Separate routines may be used for NVOD, VVOD and interactive program requests ad subscriber communications. An Advertisement Targeting routine may be used to generate packages of television commercials and advertisements that are targeted toward particular viewers. This routine may make use of a viewer's demographic information and/or programs watched or viewing habits to determine those advertisements that are of most interest to that particular viewer. In addition, a Program Suggestion routine can make use of similar information in order to suggest programs or actors to a specific viewer or subscriber.

Menus may be generated by the network manager which can be sent to the set top terminals from the cable headend. A Standard Menus routine can be used to locate prestored menus in the file server at the cable headend and generate a standard or generic menu that can be sent to any subscriber. A Custom Menus routine can similarly be used to locate data and generate a custom menu that can be sent to a specific subscriber. This routine makes use of a look-up table that can be used to generate text messages, which can be inserted or interleaved into prebuilt data streams that characterize various sections of the menu screen. This routine allows menus to be customized to an individual subscriber and subsequently distributed to that subscriber. Routines that can be used to send a data stream to a subscriber include a routine that prompts the file server to send the located or generated data stream to a subscriber and another routine that allows data to be sent to a subscriber in the form of text that is overlaid on a menu or program.

The present invention is not only able to operate in the digital environment but also introduces many new features to television program delivery and cable headend control.

These and other objects and advantages of the invention will become obvious to those skilled in the art upon review of the following description, the attached drawings and appended claims.

BRIEF DESCRIPTION OF DRAWINGS

FIG. 3a is a diagram of the primary components of a cable headend with a network manager showing the primary components of the network manager;

FIG. 9 is a diagram of a sample programs watched matrix;

FIG. 11 is a diagram of a sample subscriber answer look-up table used to generate responses during an interactive program.

DISCLOSURE OF INVENTION

A. Television Program Delivery System Description

1. Introduction

Figure 1:
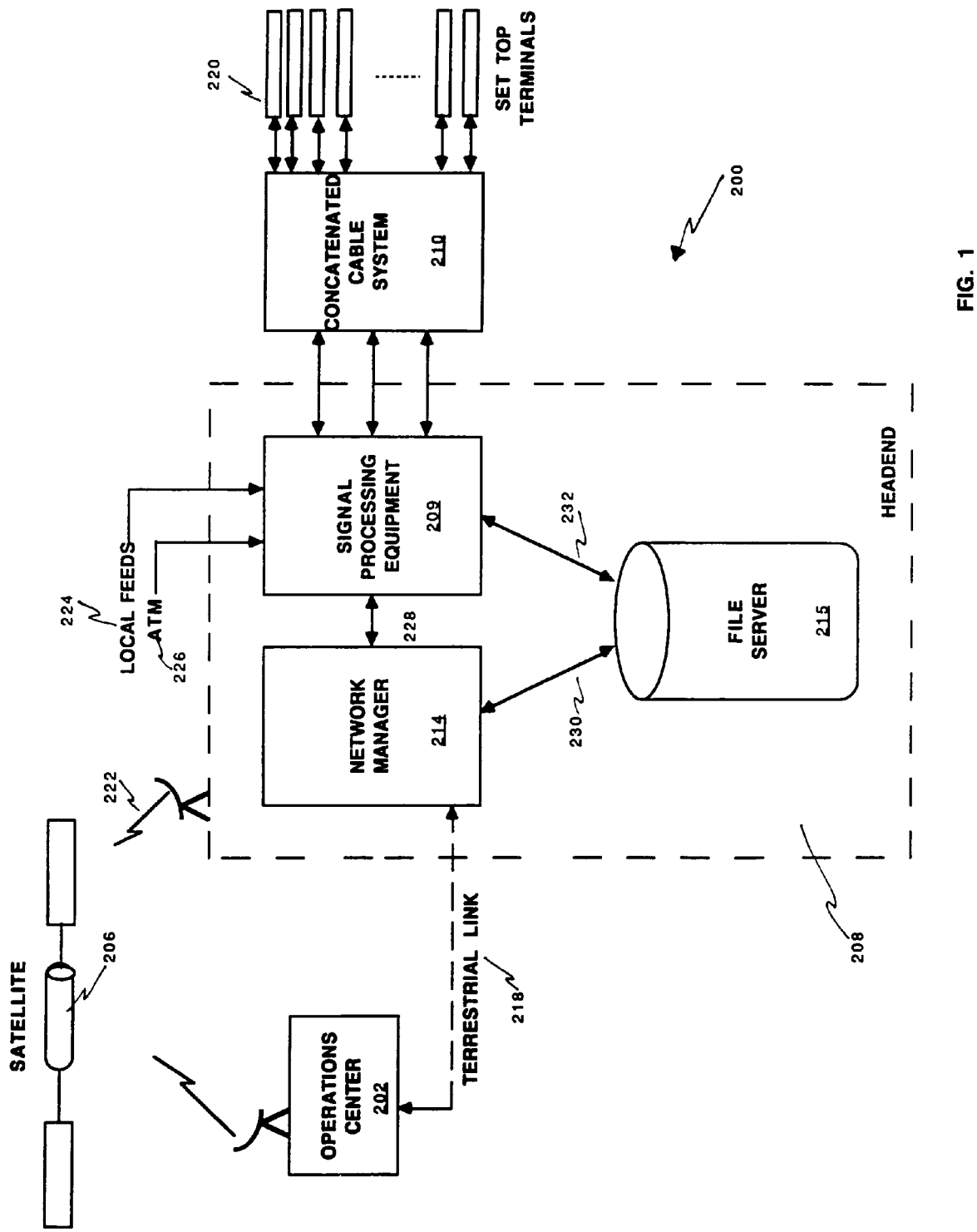
FIG. 1 is a diagram of the primary components of the television delivery system.

FIG. 1 shows the present invention as part of an expanded cable television program delivery system 200 that dramatically increases programming capacity using compressed transmission of television program signals. Developments in digital bandwidth compression technology now allow much greater throughput of television program signals over existing or slightly modified transmission media. The program delivery system 200 shown provides subscribers with a user friendly interface to operate and exploit a six-fold or more increase in current program delivery capability.

Subscribers are able to access an expanded television program package and view selected programs through a menu-driven access scheme that allows each subscriber to select individual programs by sequencing through a series of menus. The menus are sequenced by the subscriber using simple alpha-numeric and iconic character access or moving a cursor or highlight bar on the TV screen to access desired programs by simply pressing a single button, rather than recalling from memory and pressing the actual two or more digit numeric number assigned to a selection. Thus, with the press of one button, the subscriber can advance from menu to menu. In this fashion, the subscriber can sequence the menus and select a program from any given menu. The programs are grouped by category so that similar program offerings are found on the same menu.

2. Major System Components

In its most basic form, the system uses a program delivery system 200 in conjunction with a conventional concatenated cable television system 210. As shown in FIG. 1, the program delivery system 200 generally includes (i) at least one operations center 202, where program packaging and control information are created and then assembled in the form of digital data, (ii) cable headend 208 or remote site for receiving and distributing program signals, and (iii) a concatenated cable system 210 that includes many subscribers having in-home set top terminals 220 and remote controls.

The program delivery system 200 transports digital signals or analog signals to the cable headend 208 via satellite 206 or terrestrial link 218. The signals are then transmitted by the cable headend 208 through the concatenated cable television system 210. Within the cable headend 208, received signals may be decoded, demultiplexed, managed by a local distribution and switching mechanism (such as a network manager 214), stored by a file server 215 for subsequent selection and distribution over the concatenated cable television system 210 to subscribers. Although concatenated cable television systems 210 are the most prevalent transmission media to the home, television lines, cellular networks, fiberoptics, Personal Communication Networks, ATM networks, and similar technology for transmitting to the home can be used interchangeably with this program delivery system 200.

Within the cable headend, the network manager 214, file server 215 and signal processing equipment 209 work in unison with one another to receive various programming and control signals and store such signals for intelligent selection and distribution to set top terminals. In this configuration, the cable headend 208 is capable of processing various signals from a number of sources. The cable headend 208 can receive and process RF signals 222 received over satellite 206, ATM data 226 received from various ATM networks, local feeds 224 and other data and signals received over terrestrial links 218. Such signals can be received by either the network manager 214 or the signal processing equipment 209 residing within the cable headend 208.

After reception and processing, either the network manger 214 or the signal processing equipment 209 transfer the data and/or program signals to the file server 215 for storage. The network manager 214 and signal processing equipment 209 may be linked by one or more connections 228 in order to exchange data, control information and programming signals. Similarly, the network manager 214 may access the file server 215 through a link or connection 230, while the signal processing equipment 209 may be linked or connected to the file server 215 through a similar, but independent, interface 232. These links, connections and/or interfaces accommodate the various processing functions performed by the network manager 214 and other components at the cable headend 208 in the program delivery system 200.

The set top terminals 220 residing in the program delivery system 200 may be configured to accept various types of signals. Some set top terminals 220 may be adapted to receive analog signals in standard NTSC format for use by a standard television. Other set top terminals 220 may be adapted to receive digitally compressed programming, and thus, may require a decompressor to be housed within such a set top terminal 220. The decompressor would decompress any compressed signals so that other set top terminal 220 hardware could convert the decompressed signals into analog signals for television display. The program deliver system 200 is flexible enough to accommodate various digital compression techniques, including MPEG or MPEG2 signaling.

Each set top terminal 220 located at a subscriber location includes a subscriber interface (not shown). The subscriber interface is typically a device with buttons located on the set top terminal 220 or a portable remote control (not shown). In the preferred embodiment, the subscriber interface is a combined alpha character, numeric and iconic remote control device, which provides direct or menu-driven program access. The preferred subscriber interface also contains cursor movement and go buttons, as well as alpha, numeric and iconic buttons. This subscriber interface and menu arrangement enables the subscriber to sequence through menus by choosing from among several menu options that are displayed on the television screen. A subscriber may bypass several menu screens and immediately choose a program by selecting the appropriate alpha character, numeric or iconic combinations on the subscriber interface.

3. Operations Center

The operations center 202 performs two primary services: (i) packaging television programs for transmission, and (ii) generating the program control information signal. The operations center 202 typically receives television programs from external sources in both analog and digital format. Examples of external program sources are sporting events, children's programs, specialty channels, news, advertisements, infomercials or any other program source that can provide audio or video signals. Once the programs are received from the external program sources, the operations center 202 digitizes (and preferably compresses) any program signals received in analog form.

The operations center 202 packages the programs into groups and categories which provide optical marketing of the program to remove sites, cable headends, and subscribers. For example, the operations center 202 may package the same programs into different categories and menus for weekday, prime time and Saturday afternoon viewing. The operations center 202 packages the television programs in a manner that enables both the various menus to easily represent the programs and the subscribers to easily access the programs through the menus.

Once the program packages have been created, the operations center 202 generates a program control information signal that is delivered with the program packages to the cable headend 208 and/or set top terminals 220. The program control information signal contains a description of the contents of the program package, commands to be sent to the cable headend 208 and/or set top terminals 220, and other information relevant to the signal transmission. This signal may include information on program packages (e.g., channel number, program title, program length, program category, start times, etc.) and menu content (e.g., menu locations of messages, graphics and video; menu colors; text fonts, sizes and styles; and other menu information)

Upon packaging the signals and creating the program control information signal, the operations center 202 may employ digital compression techniques to increase existing satellite transponder capacity. Preferably, the signals are digitally compressed in MPEG or MPEG2 format. The program packages and program control information signal are subsequently delivered by the operations center 202 over satellite 206 to the cable headend 208 or the set to terminals 220. The operations center 202 may also provide data and control information over terrestrial link 218 to the cable headend 208.

4. Cable Headend

After the operations center 202 has compressed and encoded the program signals and transmitted the program and program control information signals to the satellite, the cable headend 208 receives and further processes the signals before the signals are relayed to each set top terminal 220. Each cable headend site is generally equipped with multiple satellite receiver dishes. Each dish is capable of handling multiple transponder signals from a single satellite and sometimes from multiple satellites.

As an intermediary between the set top terminals 220 and the operations center 202 (or other remote site), the cable headend 208 performs two primary functions. First, the cable headend 208 acts as a distribution center, or signal processor, by relaying the program signals to the set top terminal 220 in each subscriber's home. In addition, the cable headend 208 acts as a network manager 214 by receiving information from each set top terminal 220 and processing such information and passing it on to an information gathering site such as the operation center 202.

A detailed description of these functions is found in a copending application, U.S. Ser. No. 08/160,280, filed Dec. 2, 1993, entitled NETWORK CONTROLLER FOR CABLE TELEVISION DELIVERY SYSTEM, now U.S. Pat. No. 5,600,364, which is incorporated herein by reference.

The network manager 214 works in unison with the signal processing equipment 209 and file server 215 to manage cable headend 208 operations. The network manager 214 oversees signal reception, processing, storage, and intelligent selection, and distribution of video, audio and data signals to subscribers in the program delivery system 200. The signals may include: (i) audio and video signals for a given program, either in analog or digital format, and (ii) data that may consist of authorization codes, menu information, program packaging information, text messages and other control and configuration information.

The network manager 214 is capable of processing upstream information received from the set top terminals 220, whether such information is received by a telephone line (not shown) or upstream over the concatenated cable system 210. In this configuration, the network manager 214 may, for example, compile programs watched information and perform real time processing of subscriber requests for programs. With these capabilities the network manager 214 can oversee and perform various system services, including: (1) near video-on-demand (NVOD), (2) virtual video-on-demand (VVOD), (3) video-on-demand (VOD), (4) interactive program services, (5) program suggestion features, (6) advertisement targeting, and (7) account and billing processing.

In the preferred system, RF signals 222 are received at the cable headend 208, along with local feeds 224 and ATM data 226. The RF signals 222 may include both broadcast signals in analog format and digital programming signals and program control information in digitally compressed format, such as MPEG or MPEG2. In addition, the cable headend 208 may receive data and control information over terrestrial link 218 from the operations center 202. Collectively, these signals and data are processed by the signal processing equipment 209 and/or network manager 214. All analog signals are converted to digital format encoded and compressed.

Once all signals are in a compatible digitally compressed format (e.g., MPEG2), these signals in the form of digital data are stored in the file server 215. The file server may be a commercially available file server that can store between 10 to 50 gigabytes of digital data. Such file servers are commercially available, including those manufactured by Hewlett Packard and Digital Video.

After the digital signals are stored in the file server 215, each digital signal may be accessed 230 or 232 by the network manager 214 or signal processing equipment 209 and sent over the concatenated cable system 210 to the set top terminals 220. Depending on the type of set top terminal 220 involved, programs may be intelligently selected upon request from the set top terminal 220 itself or some other device (e.g., telephone) at each subscriber location. Programs, menus, and advertisements, for example, may be provided to individual set top terminals 220 in this configuration based on either a request received from a subscriber or some other information used by the network manager 214. Alternatively, the network manager 214 can oversee or manage the signal processing equipment 209 in intelligently selecting the program, menu, or advertisement for distribution.

Upstream requests from the set top terminals 220 can be processed at the headend 208 by either the network manager 214 or the signal processing equipment 209 in the form of subscriber requests. Again, depending on the type of set top terminal 220 involved, upstream data transmissions may be processed in real time or non-real time. The preferred system uses real time processing of upstream data transmissions in order to accommodate, for instance, analog or digital video-on-demand program requests within the program delivery system 200.

5. Set Top Terminals

The program delivery system 200 may include many different types of set top terminals, including: (1) basic analog set top terminals, (2) analog pay-per-view (PPV) set top terminals, (3) analog impulse pay-per-view (IPPV), or video-on-demand (VOD) set top terminals, and (4) digital set top terminals. The network manager 214 and other equipment at the cable headend 208 is flexible enough to oversee, manage and coordinate operations with different combinations of these set top terminals.

B. Network Manager Description

Figure 2:
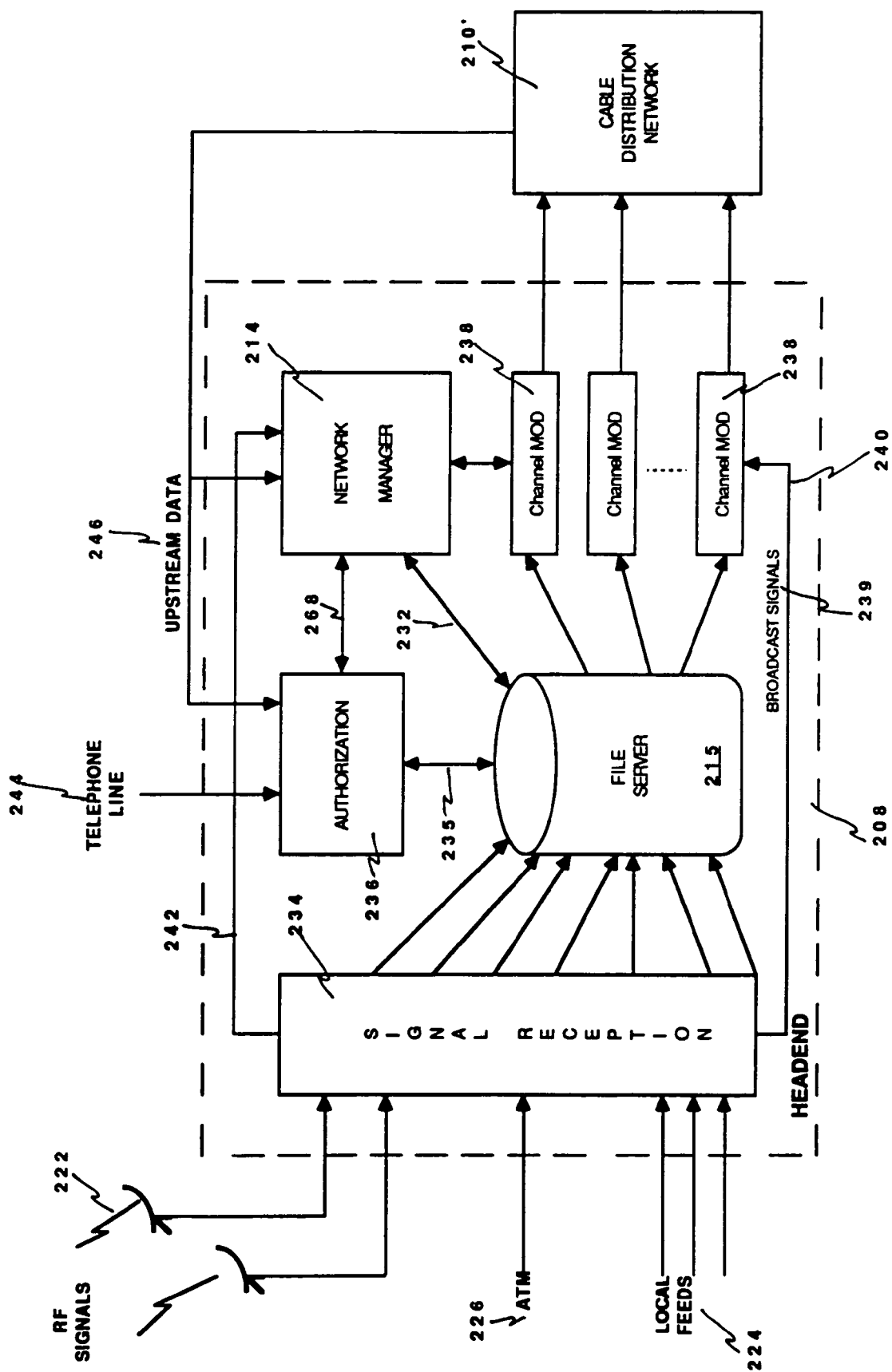
FIG. 2 is a diagram of the primary components of a cable headend having a network manager.

FIG. 2 shows the present invention as part of a cable headend 208 having a file server 215 capable of storing digital compressed data. The cable headend components shown in FIG. 2 include the network manager 214, the file server 215, signal reception equipment 234, an authorization component 236, and a set of channel modulators 238. The network manager 214 performs many of its functions using its interface 232 with the file server and its interface 268 with the authorization component 236 (which, in turn, is connected to the file server 215 over a separate connection or interface 235). The network manager 214 and other cable headend components all work with one another to provide the program deliver system 200 with NVOD, VVOD and VOD signaling capabilities. The signal reception equipment 234 receives RF signals 222 (which may include both analog or digital broadcast signals and digital programming and control information signals), ATM data 226, and local feeds 224. The signal reception equipment 234 may: (i) place various signals in storage in the file server 215 in digitally compressed format, (ii) send certain signals to the channel modulators 238 for distribution over the concatenated cable network 210' and/or (iii) send other signals to the network manger 214 for processing.

In the embodiment shown in FIG. 2, the signal reception equipment bypasses the file server 215, sending broadcast signals 239 over connection 240 directly to channel modulator 238 for distribution to subscribers. The signal reception equipment 234 also transfers certain program control information and data to the network manager 214 over a control link or connection 242. In this way, the network manager 214 can receive the program control information signal from the operations center 202 or some other remote source through the signal reception equipment 234.

The authorization component 236 can receive requests for programs from the set top terminals 220 either by telephone line 244 or upstream data transmissions 246 over the concatenated cable system 210. The authorization component 236 processes the subscriber requests, prompting the file server 215 to spool the program requested by the subscriber. Alternatively, the filer server 215 may be instructed to transmit an authorization code to the subscriber to enable descrambling or reception of a specific program by the subscriber's set top terminal 220. The network manager 214 monitors all incoming requests to the authorization component 236 in order to maintain up-to-date information on programs watched and viewing habits. By monitoring and coordinating with the authorization component 236 and the file server 215, the network manager 214 oversees, and in some cases initiates, the selection, spooling and transmission of programs, menus and advertisements to the subscribers in the cable distribution network 210'. The network manager 214 may also receive upstream data 246 directly.

FIG. 3a shows a more detailed illustration of the cable headend 208 components with a file server 215 and network manager 214. As shown in the figure, the headend includes signal reception equipment 234, an authorization component 236, a file server 215, MPEG decoders 250, a buffer with frame repeat 252, channel modulators 238, and the network manager 214. The network manager 214 includes several components. These components include a receiver 254 or set of receivers 254 (including a demodulator 254', demultiplexer 254" and/or buffering circuitry 255), a work station 256, a program control information (PCI) signal processing capability 258, a network management central processing unit (CPU) 260, data bases 262, control software 264 and an instruction memory 266 (which stores computer program instructions that may be executed by the network management CPU 260). These components are exemplary of the components that reside within the network manager 214; however, other components, such as additional storage (e.g., RAM, ROM, EPROM, and EEPROM), processors, work stations, receiver equipment, signal processing devices, and additional software may also be included in the network manager 214.

The network manager 214 uses such components in its coordination and management of cable headend 208 operations. For example, the network management CPU 260 is linked or connected to all other components in the network manager 214. The network management CPU 260 also includes connections or links, either directly or indirectly, with other cable headend 208 components.

As shown in FIG. 3a, the network management CPU 260 is linked to the authorization component 236 through a data and signal interface 268 (which may be the same or an interface separate from the interface 235 shown in FIG. 2 that connects the authorization component 236 with the file server 215). The network management CPU 260 also coordinates and manages file server 215 functions through a separate interface 232. These interfaces between the network management CPU 260, on the one hand, and the authorization component 236 and file server 215, on the other hand, may be direct or indirect through one or more interfaces. Such interfaces may be RS-232, RS-422, or IEEE-488 compatible. The network management CPU 260 also monitors and, in some instances, instructs the channel modulators 238 in regard to program distribution and signal processing activities over a separate connection or interface 269.

Within the network manager 214, the network management CPU 260 includes a number of internal connections, links, or interfaces. Such links, connections or interfaces include direct or indirect full duplex data and signal paths, including a connection 270 to receiver 254, a connection 272 to work station 256, a connection 274 to the PCI signal processing equipment 258, a connection 276 with the data bases 262, a connection 278 with the instruction memory 266, a connection 280 with the control software 264, as well as other connections to additional internal components as described herein. The network management CPU 260 uses these links, connections, and interfaces to exchange data and program signals with other network manager components and devices. Using such components and devices, the network manager 214 performs its cable headend 208 operations.

The receiver 254 or set of receivers 254 is equipped to receive upstream data transmission 246 from the subscriber. This receiver 254 or receivers 254 may simply be a telephone modem or more sophisticated control receiver equipment that is adapted to receive upstream data transmissions 246 directly from the cable distribution network 210, 210' (FIGS. 1 and 2). The network management CPU 260 coordinate such reception by the receiver 254 or receivers 254.

The PCI signal processing equipment 258 is interfaces with the cable headend 208 signal reception equipment 234. The PCI signal processing equipment 258 enables the network manager 214 to receive the program control information signal from the operations center 202 or another remote site through an interface 242 with the signal reception equipment 234. The program control information signal is received by the network manager 214 and processed by the network management CPU 260 using the control software 264.

In some instances, the network management CPU 260 stores the data carried by the program control information signal. This data includes data on program packages and menu content and can be stored within the network manager databases 262. The network manager 214 can modify the program control information signal and transmit the modified program control information signal to those set top terminals 220 in the cable distribution network 210' which require the use of such data in order to generate menus or perform other local processing capabilities.

The network manager 214 data bases 262 includes a variety of databases in which data from upstream transmissions 246 from the subscribers can be stored. The databases 262 may also store information and data on program packaging, menu content, advertisements and billing. No set number of databases 262 are required for the network manager 214 to perform its operations, and a single temporary database may be used. In the preferred embodiment, however, the network manager 214 uses several databases 262 that are accessed 278 during network management operations.

The network management CPU 260 also acts with the instruction memory 266 as needed in order to run certain control and network management software 264. Such software may be stored in the instruction memory 266 or in one or more other storage locations within the network manager 214.

By maintaining links with the authorization component 236 and the file server 215, the network manager 214 is flexible enough to maintain up-to-date programs watched information. Such programs watched information can be based on upstream data transmission 246 that are received over the cable distribution network 210, 210' or through a telephone line 244. The network manager's 214 connection 232 with the file server 215 allows the network manager 214 to coordinate and manage intelligent selection and spooling of programs, menus and advertisements stored in the file server 215. Alternatively, the software resident within the network manager 214 may reside within the file server 215 itself or certain functions may be split between the two cable headend components.

Figure 3B:
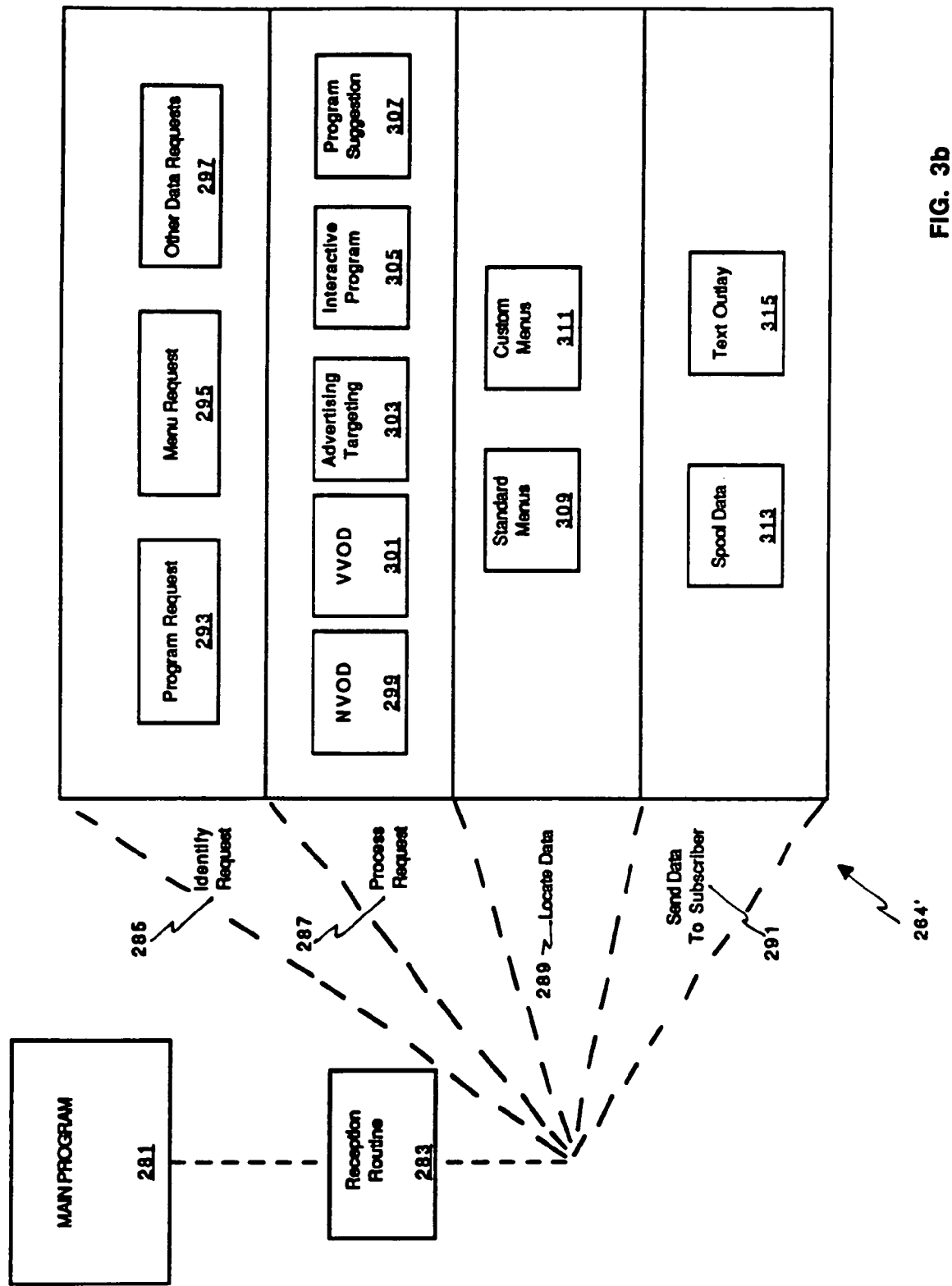
FIG. 3b is a diagram that shows the overall structure of the processing levels performed by the network manager.

The network management CPU 260, the control software 264 and the instruction memory 266 are used to accomplish many of the processing capabilities of the network manager 214. FIG. 3b illustrates the various levels of processing capabilities that can be performed by the network manager 214. Specifically, FIG. 3b illustrates an example of the processing routines 264' that are included within the control software 264 (shown in FIG. 3a).

As shown in FIG. 3b, the processing routines 264' includes Main Program 281 that calls a Reception routine 283 as subscriber communications are received. The first level of processing involves identifying the subscriber request 285. This level of processing can use a Program Request routine 293 and a Menu Request routine 295 as well as other routines 297 for other data requests. The second processing level involves processing the subscriber request 287. This second processing level may make use of several routines, including an NVOD routine 299, a VVOD routine 301, an Advertisement Targeting routine 303, an Interactive Program routine 305, and a Program Suggestion routine 307. The third level of processing involves locating the data that corresponds to the subscriber's communication or request 289. Typically, this third processing level may involve the use of a Standard Menus routine 309 and/or a Custom Menus routine 311. The final processing level involves sending the data located in the previous step to the subscriber 291. This final level of processing can involve a Spool Data routine 313 and a Text Overlay routine 315.

Using such a set of processing levels, the network manager 214 can use its control software 264 (FIG. 3a) and processing routines 264' to: identify the type of a subscriber request 285 received in the subscriber communications; process the subscriber's request 287 to determine the data to reply to the identified subscriber request; locate the reply data corresponding to the subscriber's request 289; and send the located reply data to the subscriber 291 for local processing by the subscriber's set top terminal. FIG. 3b provides only an example of the various processing capabilities available within the network manger 214 (FIGS. 1, 2, and 3a) and those skilled in the art will recognize that a number of other variations in processing levels and routines are feasible.

Although other routines are feasible, the routines identified in FIG. 3b can be used to perform the network manger's monitoring and management functions. The Reception routine 283 is the initial routine called by the Main Program 281 upon receiving a subscriber communication. The Reception routine 283 can be used to interpret the subscriber communication. The Reception routine 283 designates the type of subscriber communication as a program request or a menu request (or, in other embodiments, as a data services request). Depending on the type of request, the Reception routine 283 calls either the Program Request routine 293 or Menu Request routine 295 (or the Other Data Requests routine 297).

With reference to FIGS. 3b, the Program Request routine 293 is one of the routines that identifies the type of request carried by the communications from a subscriber. The Program Request routine 293 is called by the Reception routine 283, 283' for all subscriber communications that are program related. The Program Request routine 283, 283' identifies the type of program request in real time as a NVOD program request, a VVOD program request, an interactive program request, and/or a request that may be used in the targeting of advertisements to a subscriber. The Program Request routine identifies the request and calls the appropriate routine to process the program request.

The Menu Request routine 295 is another routine that identifies the type of request carried by the communications received from a subscriber. The Menu Request routine 295 is called by the Reception routine 283 for all subscriber communications that are menu related. The Menu Request routine 295 identifies the type of menu request in real time as a standard menu or a custom menu. The Menu Request routine identifies the request and calls the appropriate routine to process the menu request.

The NVOD routine 299 is one of the routines that can process a program request. The NVOD routine 299 is called by the Program Request routine 293 in order to process a request for a NVOD program. The NVOD routine 299 determines whether a menu or video will be displayed in response to the subscriber request. Where a video is to be displayed, the routine determines the channel carrying the requested program with the nearest start time (to the time of the subscriber's request). The subscriber will subsequently be sent data that instructs the subscriber's set top terminal to switch to that channel. The NVOD routine 299 calls the appropriate routine to locate and/or send the response to the subscriber.

The VVOD routine 301 is another routine that processes a program request. The VVOD routine 301 is called by the Program Request routine 293 in order to process a request for VVOD program. The VVOD routine 301 determines whether a menu or video will be displayed in response to the subscriber request. The VVOD routine 301 calls the appropriate routine to locate and/or send the response to the subscriber.

The Advertisement Targeting routine 303 is a routine that generates packages of television commercials and advertisements geared towards particular viewers. This routine may make use of a viewer's demographic information and/or viewing habits to determine those advertisements that are of most interest to that particular viewer. In so doing, the routine 374 outputs packages of advertisements targeted towards each viewer.

The Interactive Program routine 305 is another routine that may process a program request. The Interactive Program routine is called by the Program Request routine 293 in order to process a request during an interactive program. The Interactive Program routine 305 makes use of a look-up table that pre-stores all possible subscriber answers to interactive questions posed during an interactive program. The use of a look-up table enables the routine to process subscriber communications and determine a message or video response that can be rapidly generated in order to perform real time interactivity.

The Program Suggestion routine 307 is a routine that responds to a menu request 295. The routine 307 generates particular menus displaying programs for subscriber selection that are geared towards particular subscribers. This routine may make use of a viewer's demographic information and/or viewing habits to determine those programs or program categories that can be suggested to the subscriber. The routine may also, for example, make use of text searches of program abstracts or query the subscriber for mood in order to determine a suggestion. Thus, the Program Suggestion routine 303 can determine whether video data or a menu should be sent to the subscriber in order to carry out the suggesting process.

Once one of the above routines that processes requests has been run, one of routines that can be used to locate data and generate menus can be called. The Standard Menus routine 309 is a routine that is used to locate data in the file server 215 and generate a standard or generic menu that can be sent to any subscriber. The Standard Menus routine 309 makes use of menus that are pre-stored in the file server 215. The Standard Menus routine locates the data for the pre-stored menus so that the located data for the menu can be subsequently sent to a subscriber.

The Custom Menus routine 311 is a routine that is used to locate data and generate a custom menu that is to be sent to a specific subscriber. Because the custom menu must be rapidly created and sent to the subscriber, the Custom Menu routine makes use of a standardized menu format having pre-stored background sections so that MPEG data streams can be built for sections of the menu screen in anticipation of the subscriber's communication. In conjunction with the pre-stored menu sections, the routine also makes use of a look-up table that can be used to generate text messages of pre-determined lengths. The routine can then insert or interleave the generated text messages with the pre-built data streams in order to generate a customized menu screen in real time. Alternatively, the menu screen can be built in full and text messages overlaid using text overlaying techniques.

Once a menu has been located or generated or a program request has been otherwise processed, the MPEG data stream located or generated must be sent to a subscriber. The Spool Data routine 313 is a routine that is used to spool such located or generated data. The Spool Data routine 313 prompts the file server 215 to send the located or generated data stream to the subscriber.

The Text Overlay routine 315 is another routine that can be used to send the located or generated data to a subscriber. This routine allows data to be sent to a subscriber in the form of text that can be overlaid on a menu or program. The routine accommodates both methods of (i) sending text embedded in a signal carrying the menu data, which enables a set top terminal with a text generator to process the signal and text message and overlay the text onto the menu; and (ii) generating a text message and inserting the text message at the cable headend 208 into the signal that carries the menu data before the signal is distributed to the set top terminals 220.

In addition to the above routines, many other routines 297 may be used by the network manager in performing its processing functions. For example, an Account/Billing routine may be run to generate billing reports for each set top terminal 220. Those skilled in the art will recognize a number of other routines and processing flow that can be used to perform the same functions.

Figure 3C:
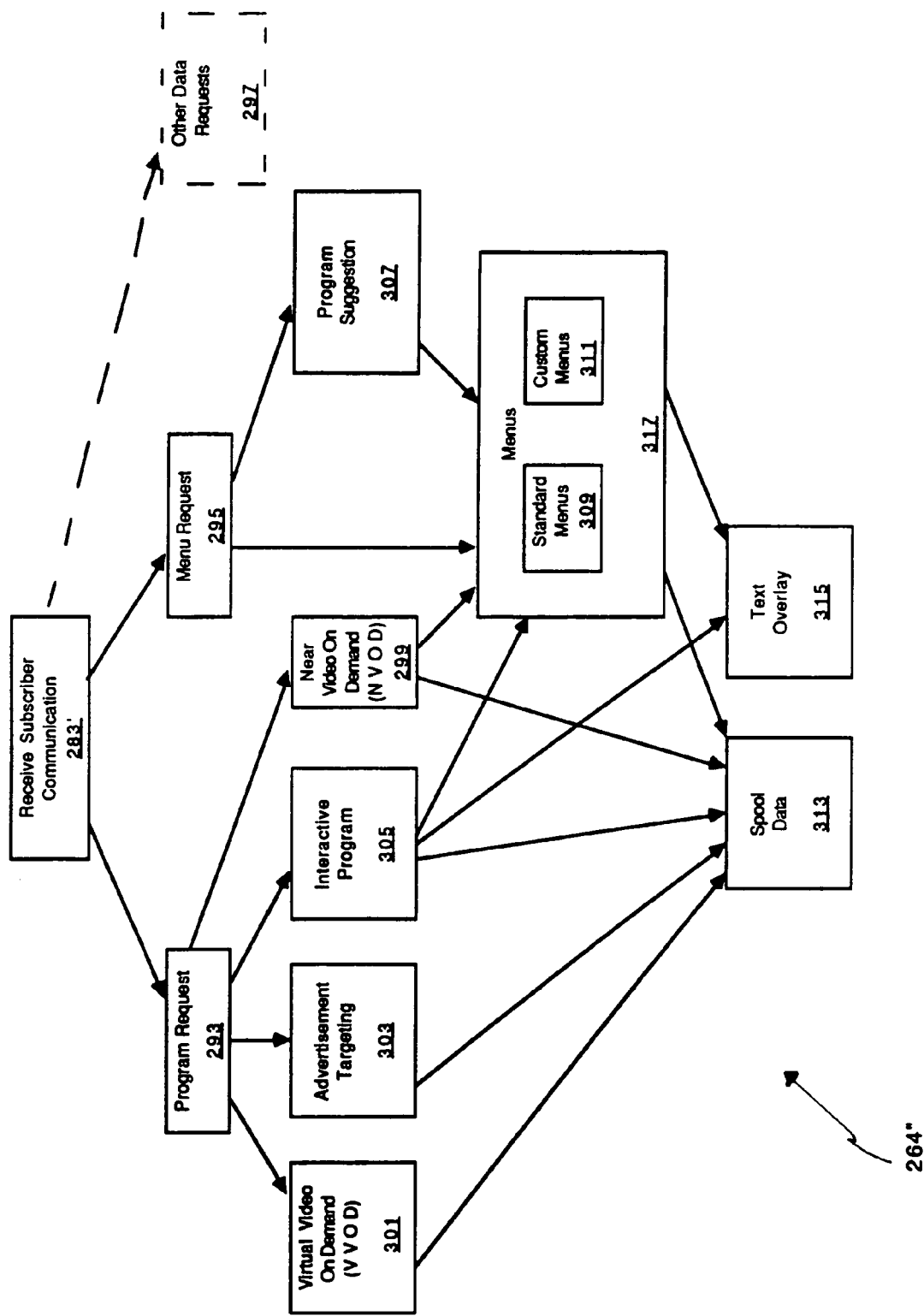
FIG. 3c is a diagram of a decision tree showing the processing steps performed by the network manager.

FIG. 3c provides a sample decision tree 264" for the various processing routines 264' that are depicted in FIG. 3b. The sample decision tree 264" illustrates the steps that the network manager 214 may perform in processing subscriber communications. For example, where a subscriber is viewing an interactive program and wishes to respond to a question asked during the interactive program, the subscriber's answer would be received by a Receive Subscriber Communications routine 283'. This routine 283' would interpret the subscriber's communication and identify the subscriber's answer as a program request, calling the Program Request routine 293.

The Program Request routine 293 would, in turn, call the Interactive Program routine 305 in order to process the subscriber request. The data corresponding to the response to the subscriber's request (or "answer" in this example)

would then be located and spooled for distribution to the subscriber by the spool data routine 313. If the response to the subscriber's answer processed by the interactive program routine 305 requires the use of a menu or another method for generating a question to the subscriber, the menus routines 317 would be called before the data is spooled by the spool data routine 313 or the question is overlaid on the interactive program using the text overlay routine 315. The decision tree 264" in FIG. 3c allows all subscriber communications and/or requests to be processed by the various routines 264' that are used with other network manager 214 components.

Figure 4:
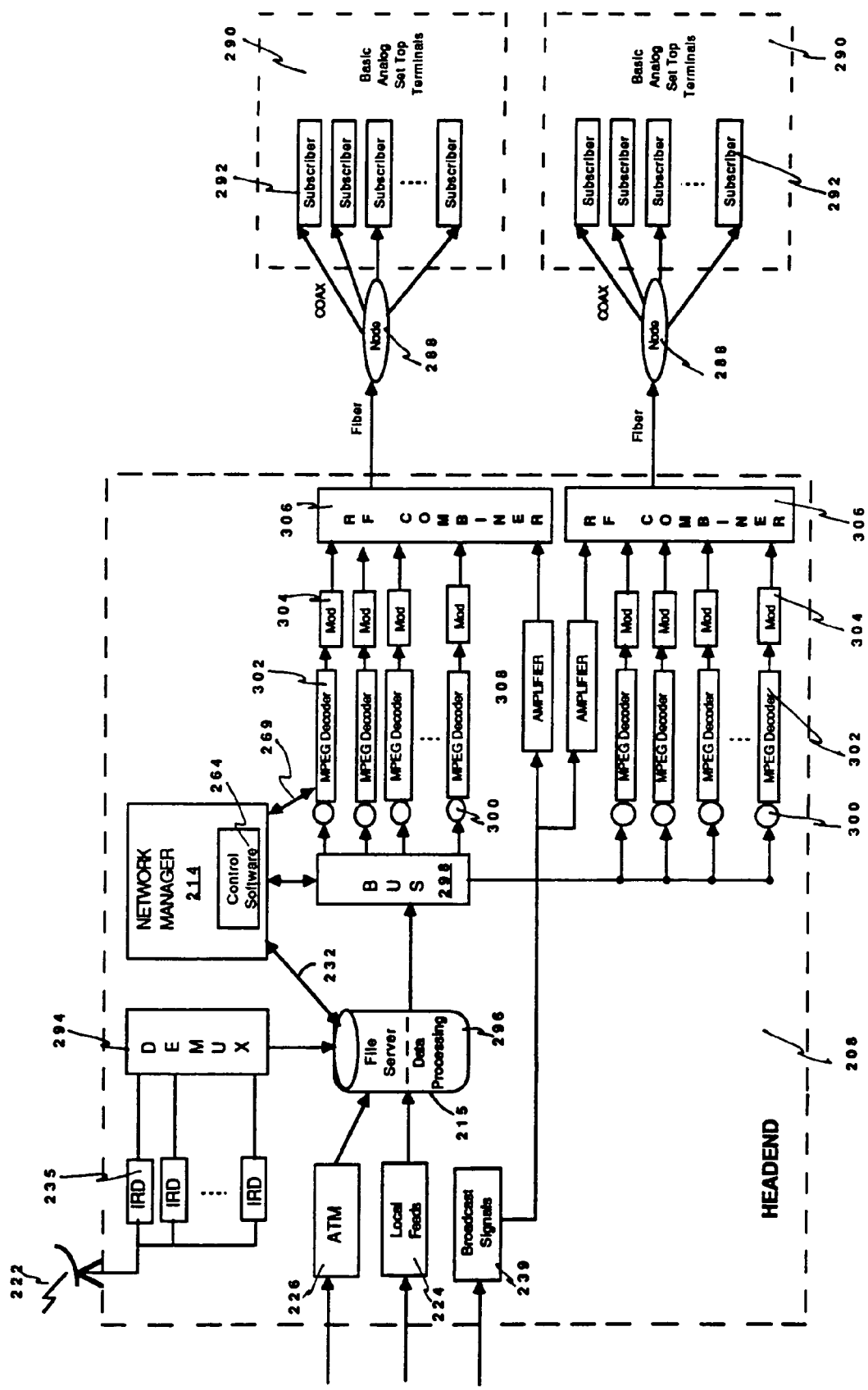
FIG. 4 is a schematic of the headend components with a network manager operating in a basic analog environment.

FIG. 4 shows an embodiment of the present invention residing at a cable headend 208 operating with a number of nodes 288 of basic analog set top terminals 290 at subscriber locations 292. As shown in the figure, the headend 208 components are capable of receiving signals from a plurality of sources, including RF signals 222, ATM data 226, local feeds 224, and broadcast signals 239. The RF signals 222 are received by integrated receiver decoders 235 and passed to a demultiplexer or set of demultiplexers 294. The RF signals 222 are received in digitally compressed format so that the signals may similarly be received by IRFs 235 and demultiplexed by demultiplexer 294 and stored in MPEG or MPEG2 format in the filer server 215. File server 215 includes its own software and data processing capability 296, as shown in the figure.

Programs, menus and advertisements stored in digitally compressed format in the filer server 215 can be selected and spooled to a bus 298 for further processing and distribution to the basic analog set top terminals 290. Typically, the further processing includes a buffering device 300, an MPEG decoder 302 and an analog modulator 304. The buffering device 300 stores individual frames of digital data which are decoded by the MPEG decoder 302 (which can convert digital data streams into analog signals) and subsequently modulated by the analog modulator 304. Various program signals are processed in this way and combined through RF combiner 306 for distribution to the analog set top terminals 290. The combined signals may also include broadcast signals 239 that have been received in analog form at the cable headend 208 and simply amplified 308 and combined with the other signals through an RF combiner 306 for distribution to the analog set top terminals 290.

The basic analog set top terminals 290 depicted in FIG. 4 are the lowest end analog set top terminals available today. Such basic analog set top terminals 290 do not include any descrambling components. Instead, such terminals typically only include components capable of tuning to and processing signals within a standard 6 MHz bandwidth of programming for display. Thus, interdiction devices (not shown) are the only means of security in this embodiment of the system. Subscribers 292 simply purchase weekly, bi-monthly, or monthly subscriptions to receive a set of programming channels. When an individual subscriber 292 has terminated a subscription to a set of programming channels, the interdiction device is used to jam the programming signals which the subscriber 292 is no longer entitled to receive.

Figure 5:
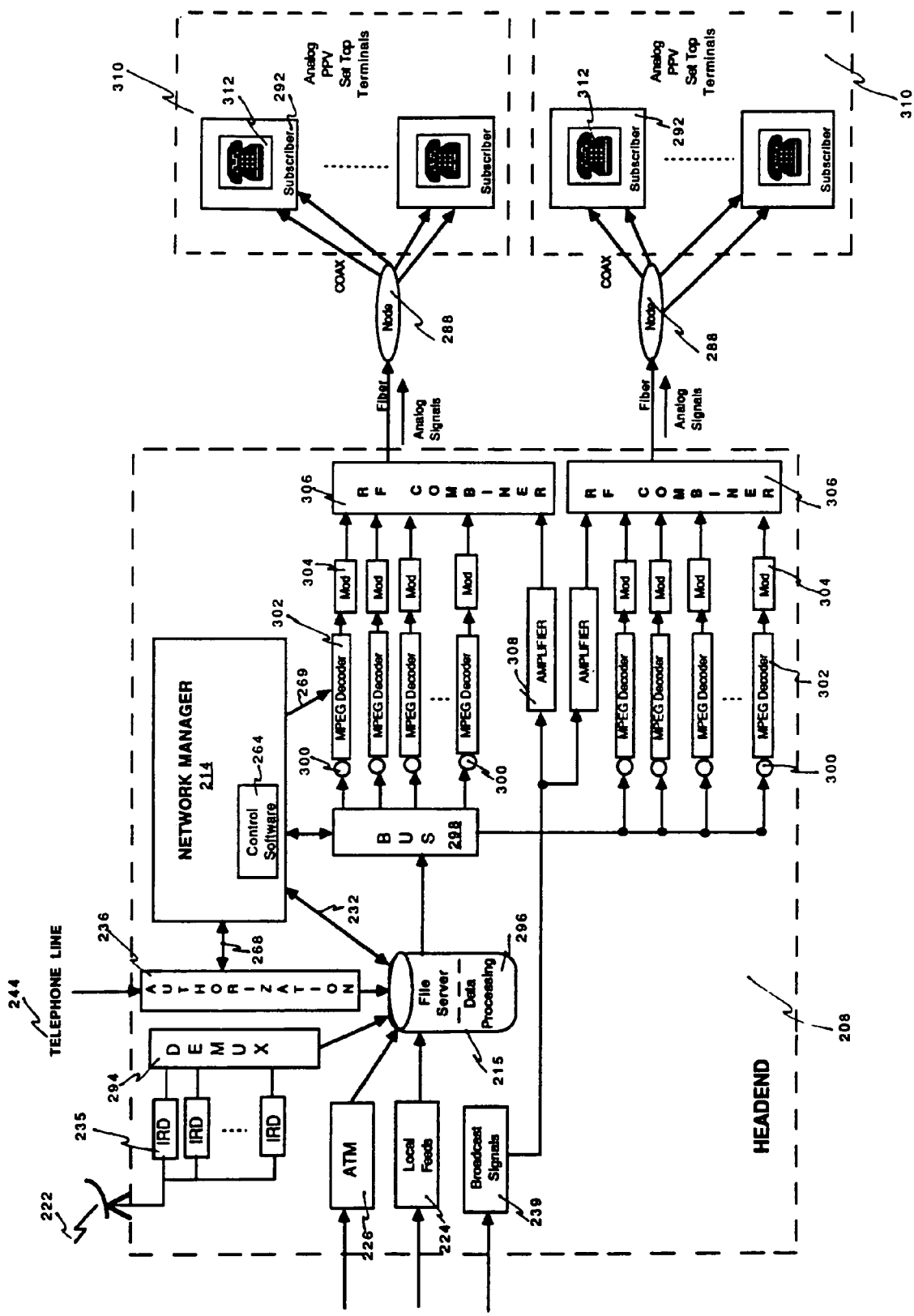
FIG. 5 is a schematic of a cable headend having a network manager operating in an analog pay per view environment.

FIG. 5 shows another embodiment of the present invention operating within the cable headend 208 in which the cable distribution network 210' includes analog PPV set top terminals 310. Such set top terminals are located at each subscriber location 292. As shown in the figure, each subscriber location 292 includes a telephone 312 which can be used for upstream data transmissions 246 for requests of PPV programs. The program requests are received over telephone line 244 by the authorization component 236. The authorization component 236 may exchange request information with the network manager 214 over an interface 268. Alternatively, the network manager 214 may receive the request directly from the subscriber's telephone 312 or the network manager 214 may simply monitor the request received by the authorization component 236 through an interface 268.

The authorization component 236 processes the request and provides the file server 215 with an authorization code for a particular PPV program. The file server 215 uses its data processing software 296 to select the particular PPV program stored. The file server 215 spools the program to a bus 298 for subsequent processing for distribution to the analog PPV set top terminals 310. This configuration of headend components and analog PPV set top terminals 310 allows for non-real time PPV program selection by individual subscribers 292 in the cable distribution network 210'.

Alternatively, the analog PPV set top terminals may include more sophisticated circuitry for upstream data transmissions so that the analog PPV set top terminals 310 would each include a data transmitter which would allow upstream data 246 to be sent to the cable headend 208 over the cable distribution network 210', rather than by using the telephone 312. In this instance, the authorization component 236 or the network manager 214 may include an automated PPV request reception system (not shown), which would automatically receive the upstream data transmissions 246 requesting individual PPV programs. In this way, an operator at the network manager 214 or somewhere else in the cable headend 208 would not be required to be involved in the PPV request processing.

In an embodiment with a more advanced analog PPV set top terminal, the set terminal may have a local authorization capability that allows the terminal to keep track of how many programs have been purchased. The numbers of programs are counted by the terminal and subsequently transferred upstream over the concatenated cable system 210 that provides the network manager 214 with the capability to tally the number of programs selected by the set top terminal 220. In an alternative embodiment, the analog PPV set top terminal does not have an upstream data transmission capability over the concatenated cable system 210, but rather the subscriber must request programs using a telephone to phone in the request. In either event, the network manager 214 works with other cable headend equipment to authorize the PPV program selection. The program is subsequently spooled from the file server 215 and sent over the concatenated cable system 210 to the set top terminals 220.

Such pay-per-view requests using analog PPV set top terminals do not involve real time processing, accommodating only a near video-on-demand (NVOD) or non-real time request. The analog PPV set top terminals typically receive programs in scrambled format and must descramble the programs in order to display them. Such descrambling may be permitted by the cable headend 208 through an authorization code that is sent from the cable headend 208 to the set top terminals 220. Alternatively, the analog PPV set top terminals may be extended a credit line from the cable headend 208 so that programs may be selected for display without then need for a real time request.

Thus, once cable bills have been paid by the subscriber, the network manager 214 may initiate a download of further credit so that the subscriber may select additional programs. In this way, the subscriber's credit is refreshed once or twice a months as bills are paid. This capability is advantageous in certain circumstances since it does not require real time processing of upstream data transmissions from the subscriber.

Figure 6A:
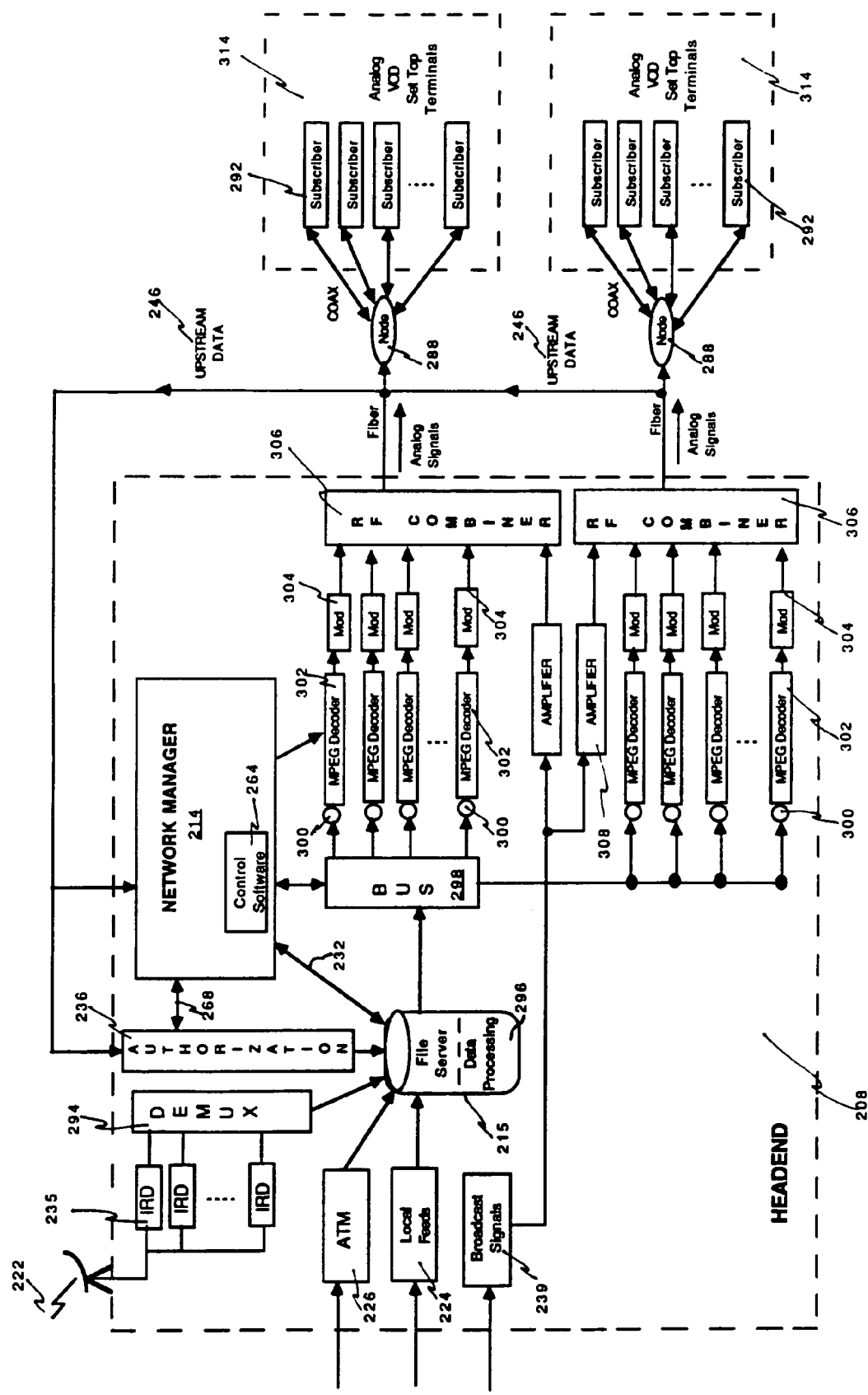
FIG. 6a is a schematic of the cable headend components including a network manager operating in an analog video on demand environment.

FIG. 6a illustrates another embodiment of the present invention operating within a cable headend 208 and with analog IPPV/VOD set top terminals 314. Each analog IPPV/VOD set top terminal 314 is capable of upstream data transmissions 246 in real time. Thus, once a subscriber 292 makes a selection for a program, for example, the request is processed over the cable distribution network (not specifically identified in the figure) by sending an upstream data transmission 246 to either the authorization component 236 or the network manager 214. This VOD program request is processed in real time in less than 2 milliseconds by either the authorization component 236 or the network manager 214. Either of these two components may perform the initial processing of the request independently or by working in unison and exchanging information over a common interface 268.

Once the request has been initially processed, the file server 215 is prompted by either the authorization component 236, network manager 214 or data processing software 296 resident within the file server 215. The system configuration is flexible enough to support program selection and processing software resident in any of these three components. Regardless of where the software resides, the file server 215 selects and spools the requested program from storage so that the program may be processed and delivered to the analog IPPV/VOD set to terminal 314. The receipt and processing of the request and the delivery of the selected and spooled program occurs all within 0.5 seconds or less in this configuration.

Typically, the analog IPPV/VOD set top terminal receives the programing a scrambled format such that the cable headend processing requires only the downstream transmission of an authorization code for the cable headend 208 to the set top terminal 220. If the analog IPPV/VOD set top terminal is not receiving the program in descrambled format, the network manager 214 prompts the file server 215 to spool the desired program for transmission to the subscriber.

The file server 215 may include its own software so that it can single-handedly process requests received from subscribers. In this alternative configuration, the network manager 214 monitors the subscriber requests and the file server 215 selection and spooling of the desired program.

In general, there are two methods in which VOD requests from analog set top terminals 314 are accommodated by the components in the cable headend 208. In the first method, the network manager 214 monitors or receives the upstream data transmissions 246 from the analog VOD set top terminals 314 over the cable distribution network. Such requests may be received by a receiver or through interface 268 from the authorization component 236. Once the request is received, the network management CPU 260 processes the request using its control software 264, accesses its instruction memory 266 as needed. Simultaneously, the authorization component 236 sends an authorization code to file server 215 so that the analog VOD set top terminal 314 that has requested a specific VOD program can be tuned to a specific preview channel until the requested program is ready to be viewed. In the preferred system, the network management CPU 260 may prompt the authorization component over a common interface 268 to authorize the specific preview channel which carries the preview.

The network management CPU 260 begins a timer upon receipt of an initial request from a subscriber 292 for the requested VOD program. The timer typically should be set to expire after a few minutes (e.g., a specified time period of 3, 5, or 10 minutes). For instance, when the timer is set for a 5 minute period, the network manager 214 will receive or monitor requests for the same program which initiated the start of the timer. During the 5 minutes that the timer is running, any other requests for that same program will be compiles, grouped or counted by the control software 264 and processed by the network management CPU 260.

The analog VOD set top terminals 314 that have transmitted these subsequent requests for the same program will be tuned to a preview channel for the remainder of the 5 minute timer period. The network management CPU 260 determines whether the timer has expired. Once the timer expires (i.e., after the 5 minute window has expired), all analog VOD set top terminals 314 that have requested the same program will subsequently be delivered or authorized to receive the requested program. The network management CPU 260 can prompt either the authorization component 236 or the filer server 215 to begin deliver of the program (or to simply download the authorization code for a program that has already been delivered in scrambled format). In either event, the analog VOD set top terminals 314 that have requested the program within the 5 minute timeframe will receive, or be authorized to receive, the requested program. The network management CPU 260 may prompt the authorization component over a common interface 268 to authorize reception. In this way, those subscribers that requested the same program within the specified time period will be authorized to receive the same channel that carries the requested program.

The processing software 296 residing within the file server 215 determines upon which program channel the requested program is to be viewed or which channel the analog VOD set top terminals 314 have been authorized to descramble the program signal requested. The processing software 296 relates this information back to the network manager 214 through a common interface 232. In so doing, the network manager 214 can coordinate, monitor and manage VOD program section and delivery.

Figure 6B:
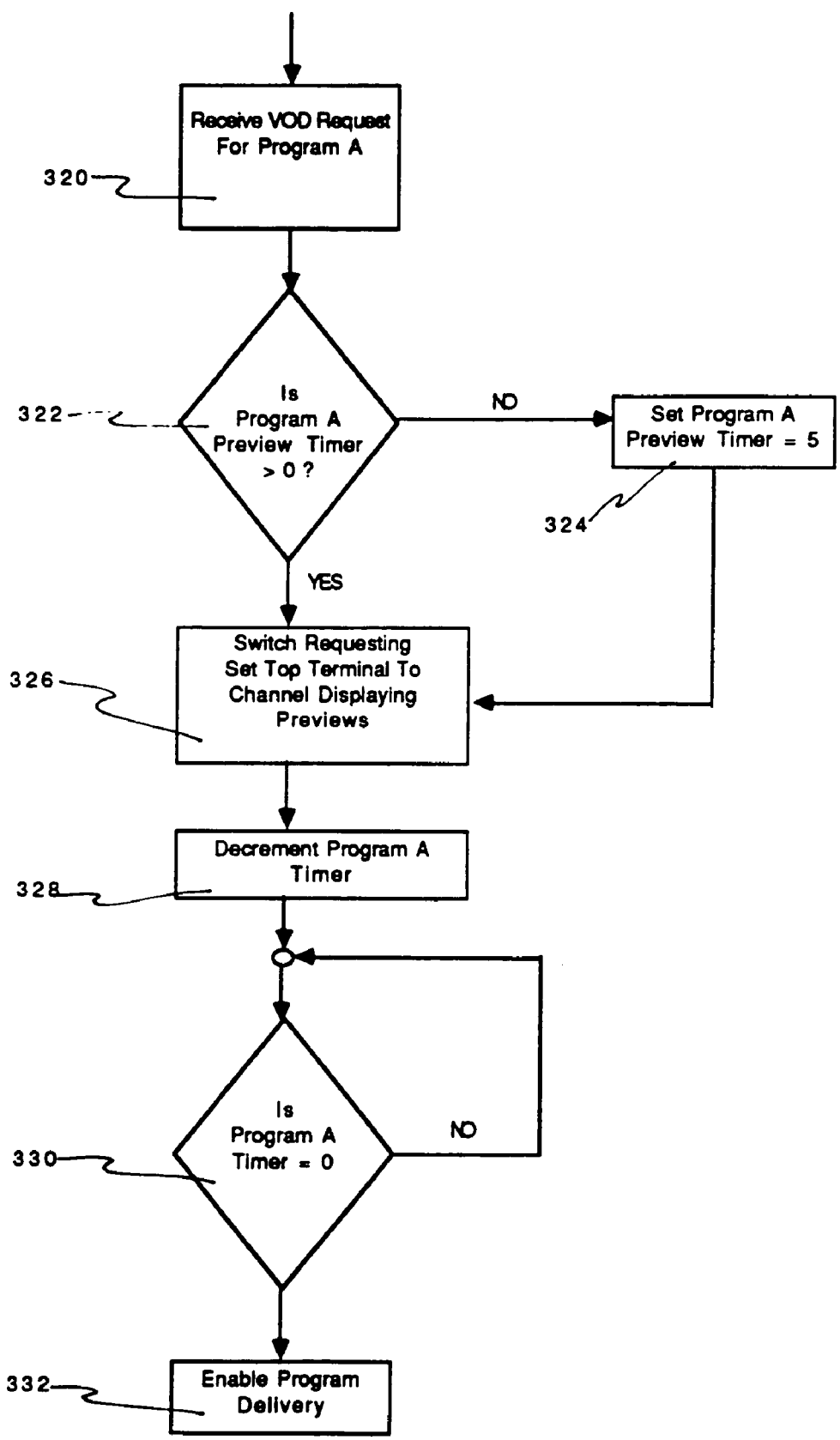
FIG. 6b is a diagram of a method to process a virtual video on demand program request.

FIG. 6b illustrates the software processing steps performed by the network manager 214 control software 264 in processing "virtual" video on demand (VVOD) program requests under the first method. The routine in FIG. 6b makes use of a timer that is keyed to the length of preview time left before the program requested is to be displayed. This timer is initially set by default to zero.

As shown in FIG. 6b, first processing step involves receiving 320 a VVOD program request. Upon receiving the request, the next processing 322 step involves determining whether the requested program has been previously requested by another subscriber or subscribers within a set time period (e.g., 5 minutes). If the requested program has not been requested by another subscriber, the program preview timer will be set to 5 minutes according to the next processing step 324. Subsequently, the set top terminal requesting the program will be switched 326 to a channel displaying previews. The program preview timer will be decremented 328 until the program timer expires 330. If the program timers expires without receiving another request for the same program, the program requested will be enable 332 for display.

If, however, another request is received for the same program 320, the program preview timer will be found to be greater than zero with some preview time left on the channel displaying the preview. In this event, the additional request for the same program is subsequently processed by switching 326 the subsequent requesting set top terminal to the channel displaying the preview. The timer for the program's preview continues to decrement 328 until it expires 330. Once the timer has expired, all requests for the same program received during the 5 minute timer period are processed by enabling 332 program delivery.

Functionally, the processing steps in FIG. 6*b* handle all incoming VVOD requests in the first method. An initial program request is received and the program preview timer is set to a time period of 5 minutes. The set top terminal requesting the program is switched to a channel that displays a preview. Once the set top terminal has been switched to preview, other requests for the same program may be received 320 before the timer expires. If another request is not received before the timer expires, the processing steps await time-out and subsequently enable program delivery 332. If another request for the same program is received before the timer expires, the additional request for the same program is processed by switching the subsequent requesting set top terminal to the channel displaying the preview. When the timer expires, all requests are grouped and program delivery is enabled 332. Once the timer has expired and an additional request for the program is received 320, the additional request, is handled like an initial request and the timer is restarted and reset to 5 minutes 324 and the process repeats itself for all incoming additional requests for a program.

In the second method, a request for a VVOD program is received, referring to FIG. 6*a* from the analog VOD set top terminals 314 by the network manager 214, either directly or from the authorization component 236 over a common interface 268. Once the network manager 214 has received the request for a VVOD program, the network manager 214, using its network management CPU 260 and control software 264, prompts the file server to start the requested VVOD program. Based on the prompts, the file server 215 selects and spools the program for processing for distribution to the specific analog VOD set top terminal 314 which requested the VVOD program. Simultaneously, the file server 215 transfers data back to the network management CPU 260 over interface 232, indicating that the program requested has been started and the channel number upon which the program has been scheduled for display. Subsequently, the network manager 214 waits for additional VVOD requests from the analog VOD set top terminal 314. Upon receiving a second request, the network manager 214 ascertains the amount of embedded preview time in the program signal and determines whether the request is within the lead in time period for previews embedded in the program signal (or MPEG program bit stream). If the embedded preview time has not expired, the network manager either prompts the authorization component 236 or the file server 215 directly so that the analog set top terminal 314 that requested this VVOD program may be instructed as to which channel the program will be display. If the embedded preview time period has expired from the initial delivery of the MPEG program bit stream, then the control software 264 treats the request for the same program like an initial request and repeats the process of either prompting the authorization component 236 or the file server 215 to spool and prepare the program for delivery to the subscribers 292. Once the time has expired, the network management CPU 260 may search for whether the program requested is currently showing.

Figure 6C:
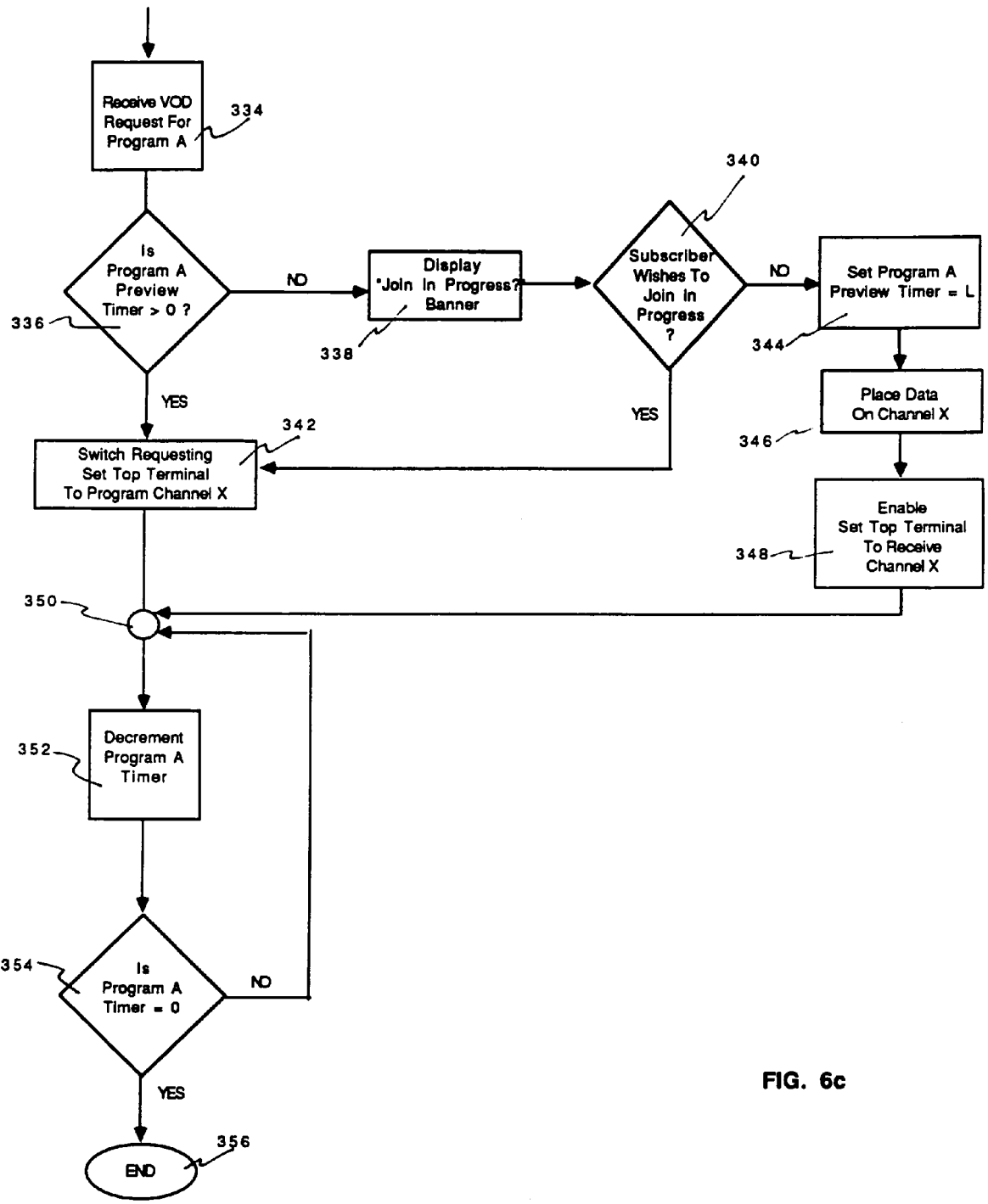
FIG. 6c is a diagram for an alternative method to process a virtual video on demand program request.

FIG. 6*c* illustrates the processing steps involved in processing a VVOD program request using the second method. The second method makes use of a preview timer that corresponds to the length of the preview time embedded in the program signal that is left before the program is ready to be displayed. As in the first method, this timer determines when and how a specific preview and program are to be displayed.

As shown in FIG. 6*c*, the processing steps for the second method being by receiving 334 a VVOD request for a specific program. The next processing step involves determining 336 whether any preview time is left to be displayed before the program itself is ready for display. If no preview time remains, the routine initiates 338 the display of a "join in progress?" banner. The subscriber is subsequently given the option 340 to join the requested program in progress. The routine interprets 340 the subscriber's response as to whether the subscriber wishes to join the program in progress.

If the subscriber chooses not to join the program in progress, the program preview timer will be set to a time length "L" 344. (This time period "L" is obtained by the network manager 214 from the file server 215 shown in FIG. 6*a*). Once the timer has been set to time "L," the routine prompts the file server to place the MPEG data on a given channel X 346. Subsequently, the set top terminal requesting the specific VVOD program is enabled 348 so that the set top terminal can receive the channel. The routine decrements the program timer 352 until the program timer has expired 354. Once the timer has expired, the network management CPU 260 may search for whether the program requested is currently showing. IF another VVOD request for the same program is received 334 before the timer expires 354, the routine will determine that preview time is available 336 and switch 342 the set top terminal making the additional request to the channel that displays the program. The routine will then continue 350 to decrement 352 to program preview timer until the timer expires 354 (at which time the routine ends 356). If yet another request is received 334 after the program timer has expired (so that the timer is not greater than zero 336), the subscriber will receive a "join in progress?" banner 338. If the subscriber chooses to join the program in progress 340, the subscriber will simply be switched 342 to the channel displaying the program.

Functionally, the routine in FIG. 6*c* allows, referring to FIG. 6*a* the network manager 214 to await an initial VVOD program request. Once an initial VVOD program request has been received the routine prompts the file server 215 to initiate program delivery. As the file server 215 begins the program delivery process, the network manager 214 receives confirmation information including channel number (upon which the program will be displayed) and the length of the embedded preview. Although the preview time length embedded in the program may be a variable length, the example in FIG. 6*c* uses a length of "L" minutes. After receiving the confirmation information, the requesting set top terminal is enabled to receive 348 the embedded preview. Subsequently, the network manager 214 awaits the receipt of additional requests for the same VVOD program. If no other requests are received, the embedded preview time will eventually expire, enabling 348 display and/or delivery of the requested VVOD program.

If, however, another request for the same VVOD program is received, the routine determines whether the embedded preview time has expired. If the embedded preview time has not expired, the system returns to the step of switching 342 the additional requesting set top terminal to the channel displaying the embedded preview. If the embedded preview time has expired, the system displays the "Join in Progress?" banner. The system subsequently determines whether the subscriber wishes to join the VVOD program in progress. If the subscriber does not wish to join the VVOD program in progress, the additional request for the same VVOD program is treated as an initial request for a VVOD program and the processing steps begin anew. If the subscriber wishes to join the VVOD program in progress, the requested VVOD program is displayed or delivered as appropriate.

In either of the two methods depicted in FIGS. 6b or 6c, the analog VOD set top terminals 314 may be required to change channels in order to receive the requested VVOD program. Specifically, three separate types of analog VOD set top terminals 314 may be used with the configuration shown in FIG. 6a. These types of terminals include an analog VOD set top terminal with: (1) a controllable tuner, (2) non-controllable tuner with a text generator, and (3) a non-controllable tuner without a text generator.

For requests involving an analog VOD set top terminal having a controllable tuner, the network manager 214 and file server 215 work in unison in order to download over the cable distribution network 210' the specific channel number upon which the requested program should be displayed. The controllable tuner will, upon receiving the download, tune the analog VOD set top terminal 314 to the proper channel.

Where the analog VOD set top terminal includes a non-controllable tuner, but has a text generator, the network manager 214 may prompt set top terminal 314 to generate a text message, which indicates to the subscriber 292 upon which channel the program is to be displayed. The subscriber 292 can then read the text message generated by the analog VOD set top terminal 314 and manually change channels in order to view the program requested. Alternatively, where the analog VOD set top terminal 314 includes a non-controllable tuner, but does not contain a text generator, a menu must be downloaded from the file server 215 over the cable distribution network 210'. An appropriate text message is embedded in the download menu signal. In this way, the menu is displayed with the text message already shown upon it so that the subscriber 292 can be informed upon which channel the requested program will be displayed.

The configuration shown in FIG. 6a also accommodates real time menu generation and processing capability. Menus are prestored in MPEG format in file server 215 so that they can be ready for selection and spooling by the file server 215 and delivery to individual subscribers 292 as the subscriber sequences the menus. In effect, the menu generation system anticipates the types of menus that the subscriber 292 will select for display. Menus are prestored in the file server 215 for each and every possible variation of menus and menu sequencing combinations. By prestoring these variations and combinations of menu screens, menus are ready for selection and spooling by the file server 215 in real time. Series of menus and submenus may subsequently be sequenced in real time based on subscriber input.

A menu may be selected and spooled by the file server 215 and delivered to the subscriber 292 as in program delivery previously described. The menu currently displayed on the subscriber's 292 television is stored in a buffer 300, which has the capability to store one or more frames of MPEG data. In this way, the file server 215 would not be required to continuously spool the menu to be displayed on the subscriber's 292 television.

Instead, once the MPEG frame containing the data for the menu has been selected, spooled and stored in the buffer 300, the frame can be repeated as necessary without reassessing the file server 215. The buffer 300 repeats the previous frame of MPEG data containing the menu screen so that the subscriber 292 receives the same menu until a new selection is made. Once the subscriber selects another menu, the subscriber's request is sent in the form of upstream data 246, like a request for a program, to the network manager 214.

Upon receiving and processing the request, the network manager 214 prompts the file server 232 to sequence the menus. The file server 215 selects the next menu in response to the request and spools the MPEG frame containing the next menu for processing. The MPEG frame for the next menu is again stored in buffer 300. The process repeats itself, again waiting for the subscriber's 292 next selection. With this configuration and processing capability, the system intelligently accommodates real time menu generation and processing capability remotely from the cable headend 208.

Figure 7:
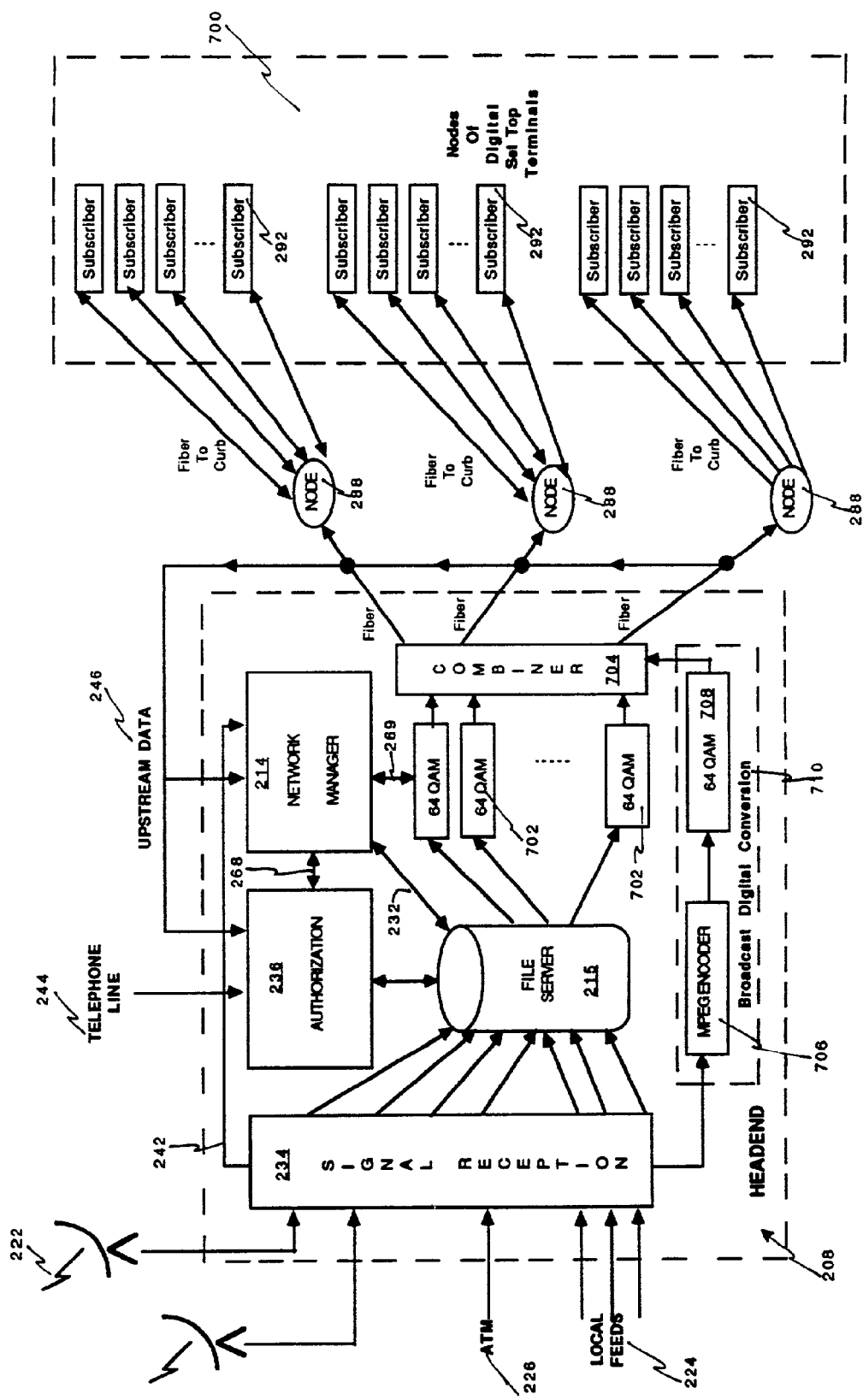
FIG. 7 is a schematic of a cable headend having a network manager operating in a digital environment.

FIG. 7 shows another embodiment of the present invention operating with several nodes of digital set top terminals 700. In this configuration, the cable headend 208 components must include digital modulators 702 in order for digital signals to be distributed to subscribers 292. The embodiment of FIG. 7 uses quadrature amplitude modulators (QAM) 702, but the artisan may use any suitable digital modulator. A combiner 704 may be used to combine various digital MPEG bit streams in providing such transmissions to the subscribers 292. The bit streams may include audio and video programs received via satellite 222 as well as ATM data 226 and local feeds 224. These signals are stored in digitally compressed (e.g., MPEG or MPEG2) format in the file server 215. Once a program or a set of data is selected and spooled by the file server 215 in digitally compressed format, the signal does not require a decoder. Instead, digital modulators 702 and other signal processing devices (e.g., combiner 704) may be used in the distribution of the digitally compressed signals.

As shown in FIG. 7, broadcast signals may be accommodated in this configuration through the use of an MPEG encoder 706 and another digital modulator 708 to convert the broadcast signals into a digitally compressed format compatible with other signals being distributed in the cable distribution network 210' (shown in FIG. 7 as 288, 292 and 700, including the connections shown therebetween). In this configuration, the program delivery system 200 can operate in the digital environment with digital set top terminals. Such digital set top terminals are adapted to receive digitally compressed program signals and control information in MPEG format. The digital set top terminals may include an MPEG decoder and decompressor so that the digitally compressed program signals may be displayed on the subscriber's television.

Menu information may be downloaded to these set top terminals 220 from the cable headend 208 in MPEG format, which may be displayed like any other program signal. Alternatively, the digital set top terminals may include a microprocessor and graphics processing capabilities in conjunction with menu generation software in order to generate menus locally at the set top terminal 220. In either configuration, the digital set top terminals include upstream data transmission hardware so that real time requests for programs may be transmitted upstream over the concatenated cable system 210 for processing at the cable headend 208.

Such requests are processed at the cable headend by the signal processing equipment 209 and/or the network manager 214. The requested program is subsequently selected and spooled by the file server 215 and transmitted downstream over the concatenated cable system 210 to the set top terminal 220. In this scenario, all transmissions, whether data or programming signals, are in digitally compressed (e.g., MPEG or MPEG2) format.

With this configuration, subscriber communications and requests may be processed from upstream data 246. The configuration accommodates VOD requests, NVOD requests, and VVOD requests, as well as advertisement targeting, interactive programming, and program suggestion capabilities. These features and capabilities may be provided through the use of real time processing of upstream data communications and/or the use of standard or custom menus.

Figure 8:
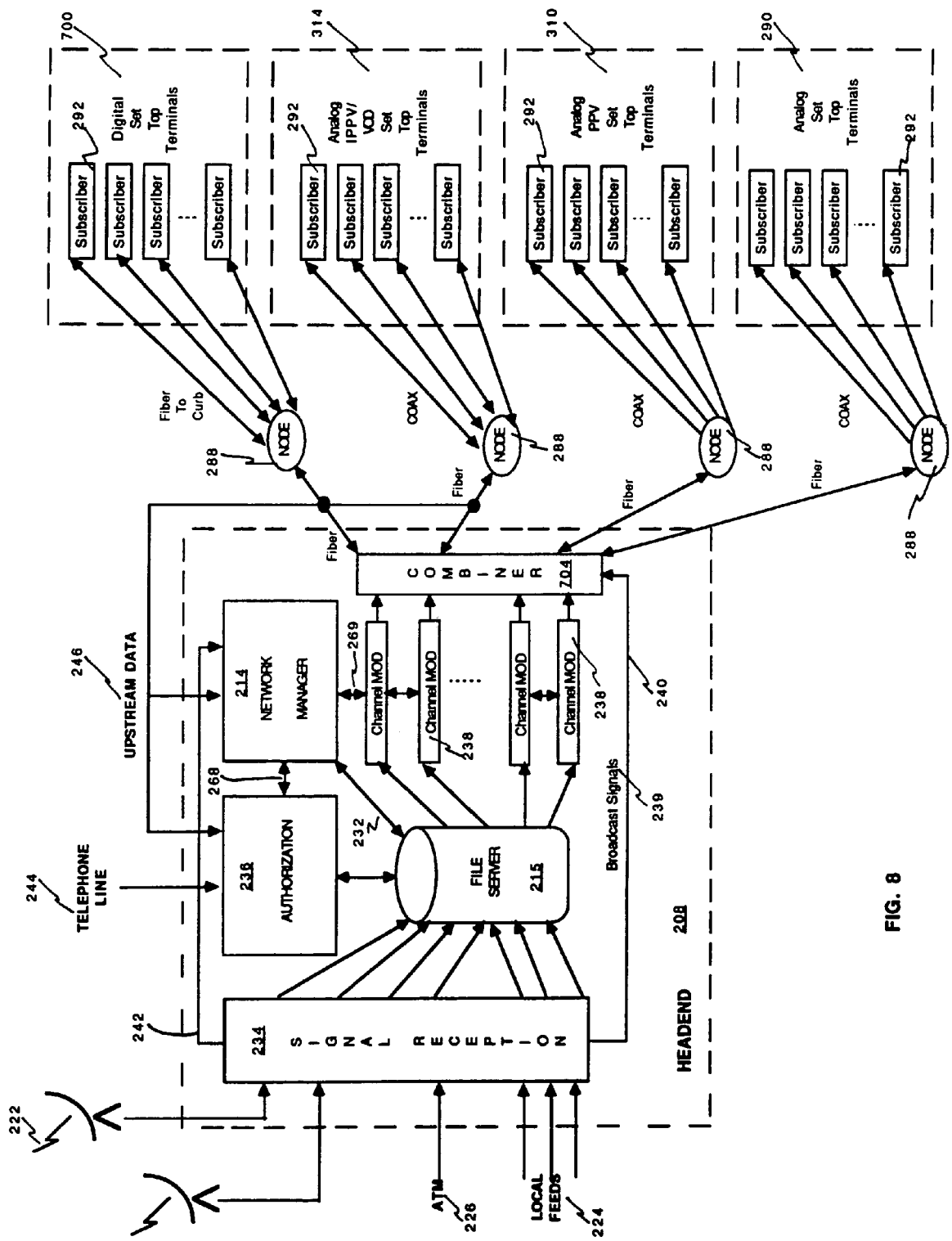
FIG. 8 is a schematic of a cable headend having a network manager operating in a mixed analog and digital environment.

FIG. 8 illustrates another embodiment of the present invention operating with a number of different types of set top terminals 700, 314, 310, 290 (including the connections shown between these components). As shown in the figure, the embodiment operates with digital set top terminals 700, analog IPPV/VOD set top terminals 314, analog PPV set top terminals 310 and basic analog set top terminals 290. This embodiment combines the various combinations of hardware components described above in order to accommodate a mixed analog and digital network of set top terminals.

The configuration shown in FIG. 8 enables the network manager 214 to identify requests from subscriber communications and process those requests, as described above. Typically, data stored in the file server 215 which corresponds to a response to a subscriber's request will be located and sent to the subscriber 292 over the cable distribution network 210' (shown in FIG. 8 as 288, 290, 292, 310, 314 and 700). The configuration shown in FIG. 8 can (subject to limitations in set top terminal processing capability) accommodate VOD requests, NOVD requests, and VVOD requests, as well as advertisement targeting, interactive programming, and program suggestion capabilities.

C. Network Manger Processing Routines

1. Receiving Information from Set Top Terminals

Referring to FIGS. 3b and 3c, the network manager 214 uses the Reception routine 283 or 283' to begin processing subscriber communications as they are received. Subscriber communications are received by the network manager 214 either directly through an upstream data receiver 254 or indirectly through an interface 268 to the authorization component 236.

The Reception routine 283 can be used by the network management CPU 260 to interpret each subscriber communication and designate the type of subscriber communication as a program request or a menu request (or, in other embodiments, as a data services request). Depending on the type of request, the Reception routine 283 calls either the Program Request routine 293 or Menu Request routine 295 (or the Other Data Requests routine 297) to identify the request as either a program request or menu request.

In designating the subscriber communication as a program request or a menu request, the Reception routine 283 or 283' must receive upstream data transmissions 246 from a subscriber 292. The upstream data transmissions may require demultiplexing and/or decompressing so that the data can be interpreted. In this way, any control or header information may be read or stripped from the data streams that are received by the network manager 214. The read or stripped data can then be used to designate or determine whether a subscriber communication involves a program request or a menu request.

Once a subscriber communication has been designated as program request or a menu request, the request can be processed by the various routines in the system. An example of processing VVOD program requests is described in reference to FIGS. 6b and 6c above.

2. Advertisement Targeting

The network manager is capable of processing subscriber communications in order to target specific commercials and advertisements to a subscriber. Such advertisement targeting may be based on historical viewing (or programs watched) data and/or other data that is available at the network manager 214. Advertisements that may be targeted include video, commercials and infomercials, with infomercials being time-varying video segments (e.g., thirty seconds, fifteen minutes).

Advertisements can be targeted using at least three different advertisement insertion methods, namely where the targeted advertisement is: (i) inserted at the cable headend 208 and sent to a subscriber 292 with an analog set top terminal 220, (ii) inserted at the cable headend 208 and sent to a subscriber 292 with an analog set top terminal 220, or (iii) embedded in a program signal (e.g., inserted at a remote location such as the operations center) and simply relayed without change by the cable headend 208 to any set top terminal.

In the first method, each MPEG decoder 302 should be capable of identifying a point in a program signal in which an advertisement can be inserted. This may be accomplished by using a MPEG decoder 302 that is capable of hearing or decoding a "Q tone" in the program signal. The Q tone provides the MPEG decoder 302 (and the network manager 214, through its connection 269 with the output of the MPEG decoder 302) with an advance indication of the point in the program where an advertisement should be inserted. The Q tone provides a set time (e.g., 30 or 60 seconds) after which the advertisement should begin.

Thus, once the MPEG decoder has decoded the digital program signal into an analog signal and received or decoded the next Q tone in the program, the network manager 214 receives an advance indication that an advertisement may be inserted by the file server 215. The network management CPU 260 prompts the file server 215 to suspend spooling of the program MPEG frames, and to select and spool the advertisement MPEG frames. The advertisement MPEG frames are decoded and distributed to the subscriber in place of the program signal. Once the advertisement ends, the MPEG frames for the program signal are restarted and spooled from the filed server 215.

Such insertion requires the MPEG decoder to monitor for a Q tone and, upon decoding a Q tone, prompt or inform the network management CPU 260. The network manager 214 then informs the file server 215 of the point at which the advertisement should begin in the program. At the appropriate time, the file server 215 selects and spools the advertisement and the advertisement is decoded from MPEG format to an analog signal and processed for display in place of the program signal.

In the second method, the network manager CPU or file server monitors the selection and spooling of each MPEG I-frame as it is processed for display. The network management CPU may accomplish this monitoring function through it connection 232 with the file server 215 or its connection 269 with the digital modulators 702. Through either connection or link 232 or 269, the network management CPU can read the I-frames that are sent to the subscribers. In the preferred system, however, the file server 215 informs the network manager CPU of upcoming advertisement time. The file server 215 can perform this function by sending confirmation frames or codes back to the network manager 214 as frames are spooled. Once an I-frame is spooled that indicates that an advertisement space is available in the MPEG data stream for the program being processed, the network management CPU 260 can prompt or instruct the file server 215 to select and/or spool a specific advertisement to be sent to a particular subscriber 292 in that advertisement space.

In the third method, the advertisement is simply embedded in the program signal before being stored at the file server 215 (whether originally in analog or digital format). This method accommodates the use of national advertisement inserts that are initiated at a remote site such as at the operations center 202. In this way, advertisements can be scheduled on a national or regional, rather than a local basis. This also accommodates the network manager adding advertisements to programs before storage at the file server 215.

Advertisements may be inserted before, during or after a program. Advertisements during programs and after programs may be targeted in advance as opposed to real-time targeting. Using any of the above three methods, advertisements may be inserted into program signals for distribution to the subscribers 292. Before, however, an advertisement may be inserted, the specific advertisement must be intelligently selected and spooled from the file server 215.

Advertisements may be intelligently selected for targeting using at least four techniques. These techniques include: (1) using programs watched data, demographics data, and/or other data stored in the network management databases 262 to target an individual subscriber with a specific advertisement for display; (2) collectively analyzing programs watched matrices, demographics information or other data stored in the network management databases 262 in order to target a group of set top terminals 220 with an advertisement; (3) performing an independent advertisement insertion using the network manager 214 components; and (4) ignoring the advance indication for an advertisement insertion so that the advertisement embedded in the program signal sent from the operations center 202 or another remote source can be sent to a subscriber 292 without interruption.

Using the first technique, advertisements may be targeted to individual subscribers based on programs watched data, demographic data and/or other data stored in the network management databases 262. Various data analysis techniques may be used to target advertisements. For example, where programs, watched information is used, the network manager 214 may process a programs watched matrix in order to assist in the intelligent selection of an advertisement for targeting.

The network manager 214 stores a programs watched matrix for each subscriber in the cable distribution network 210'. The programs watched matrices are stored in the network management databases 262 and updated as requests for programs are received in the upstream data transmissions 246 from a subscriber 292. Various other methods of storing program watched data may be used.

FIG. 9 illustrates a sample programs watched matrix. As shown in the figure, the matrix is stored in a format with rows of time slots and columns of program categories. The example in FIG. 9 shows six four-hour time slots and various program categories, including sports, news, movies, children and entertainment. The time slots and program categories may be varied as appropriate.

As subscriber requests are received, the network manager 214 processes these requests and simultaneously updates the programs watched matrix for that subscriber once a program has been requested. In this way, the network manager 214 maintains an up-to-date programs watched matrix for each subscriber in the cable distribution network 210'. These programs watched matrices may be used in determining the advertising material that is sent to a particular subscriber 292.

For instance, upon receiving an advance indication of an advertisement insertion point in a program, the network manager 214 may read the counts for the various programs categories in the current time slot from the stored programs watched matrix for that subscriber and select an appropriate advertisement. The network manager 214 uses its network management CPU 260 and control software and/or instruction memory 266 in order to complete the processing. For example, the network management CPU 260 determines the program category with the most frequently watched programs (i.e., the program category having the most counts). Once the network management CPU 260 has identified the most frequently watched program category, an advertisement may be selected from a corresponding advertisement category.

Typically, advertisements may be stored in the file server 215 by categories that correspond to the program categories so that advertisements may be easily located. Advertisements may be located by providing the file server 215 with prompts generated by the network manager 214. In this way, stored advertisements may be located by the file server 215 by: interpreting the program category (that is determined by the network manager 214 and provided during processing); pointing to the stored advertisement that corresponds to the program category; and, upon locating the desired advertisement, spooling or providing the selected advertisement to an MPEG decoder and/or channel modulator for distribution to the set top terminal sought to be targeted with the intelligently selected advertisement.

Advertisement categories may include sports, news, movies, children and entertainment. A number of other advertisement categories or subcategories may be used to group the advertisements stored in the file server 215 (as described in U.S. Ser. No. 08/160,280 cited above). Once the network manager 214 has determined the appropriate advertisement category, the network manager 214 can instruct or prompt the file server 215 to select and spool the advertisement for insertion into the program signal using any of the insertion methods described above.

In determining the program category having the most frequently watched programs or counts, the network management CPU 260 and control software 264 is flexible enough to choose between program categories that have an equal number of programs watched counts. In order to break such a tie, the network management CPU 260 and control software 264 can use demographics or other data stored in the databases 262 to weight the program categories and determine the category of most importance to a particular subscriber 292. Alternatively, a program category may be selected by default.

Various weighting algorithms may be used to determine the most important program category where more than one category has the same number of programs watched counts. In addition, a number of correlation algorithms may be used to correlate the program category selected with the advertisement category or subcategory from which the targeted advertisement is to be selected.

The second technique for determining or identifying an advertisement for targeting involves intelligently selecting an advertisement for a group of subscribers. Generally, a group of subscribers is formed from a group of requests for the same program and the network manager targets that group of subscribers with the same advertisement. This technique may best be applied in conjunction with the VVOD program request processing methods described above. For example, the network manager 214 can group together all subscribers who request the same program within a certain time period (e.g., a five-minute interval). Thus, as multiple requests for the same program are received, the programs watched matrices for those subscribers who have requested the program within the designated time period may be collectively analyzed. In this way, the programs watched matrices for those subscribers may be accumulated and an advertisement targeted to that group of subscribers can be determined based on an accumulated programs watched matrix. Once the programs watched matrices have been accumulated to generate such an accumulated or collective program watched matrix, the processing steps are analogous to those performed in the previous technique.

The third technique allows the network manager 214 to simply select an advertisement for insertion into a program signal. The selection can be independent of subscriber-specific data, thereby accommodating insertions for such purposes as local advertisements.

The fourth technique allows the network manager 214 to ignore any advertisement insertion indications. This technique allows the operations center 202 or another remote site to insert an advertisement into the program signal that will be distributed to all subscribers 292. This technique accommodates the national advertisement insertion method described above.

3. Spooling Data and Text Overlay

The network manager 214 works with the file server 215 to either locate or generate an MPEG data stream that can be sent to a subscriber. The Spool Data routine 313 enables the network manager 214 to perform this function and spool such located or generated data. In general, the spool data routine 313 can prompt the file server 215 to send the located or generated MPEG data stream to the subscriber. In order to accomplish this function, the network manager 214 stores the addresses of all MPEG data streams stored in the file server 215. The network manager 214 stores these addresses in its databases 262. Alternatively, the addresses may be stored in RAM. With the addresses, the network manager 214 can prompt or instruct the file server 215 to spool a specific MPEG data stream identified by its unique address.

The network management CPU 260 may be used to provide the prompts and/or instructions to the file server 215 through an interface 232 between the network management CPU 260 and the file server 215. In this way, the file server 215 is prompted and/or instructed to spool a specific MPEG data frame or stream. In response, the file server 215 will use its pointer to find or point to the address of the MPEG data frame or stream to be spooled and spool that set of data. The data may be spooled and sent to an MPEG decoder 250 and/or channel modulator 238 as appropriate.

The network manager 214 may also oversee and coordinate the generation of menus that include text overlays. In general, the text overlay may be performed using two overlaying techniques. In the first technique, a text message is sent to a set top terminal 220 in an embedded signal. The set top terminal 220 must have a text generator and other processing capability in order to receive and extract the text message from the embedded signal. Using the extracted text message, the set top terminal 220 can use its text generator to generate the text message that was included in the embedded signal. Subsequently, the set top terminal 220 can overlay this text message onto a menu.

In the second overlaying technique, the text message is generated at the cable headend 208 and inserted into a signal carrying the menu data. Using this technique, the text message and menu data are located or generated at the cable headend 208 under the supervision of the network manager 214. The text message is, in effect, "overlaid" on the menu screen at the cable headend 208 before the menu is distributed to the set top terminals 220.

Using either of the two overlaying techniques, data may be sent to the subscriber in the form of text that is overlaid on a menu or program. Those skilled in the art will recognize other variations of these two techniques in order to perform the same function using the network manager 214.

4. Menus a. Standard Menus

The network manager 214 can accommodate real-time menu generation and processing at the cable headend 208. Standard menus are those menus that are sent to many subscribers, such as an introductory menu or a program category menu. Standard menus are typically prestored in MPEG format in the file server 215. By prestoring the menus, each menu can be ready for selection and spooling by the file server 215 so that a menu can be delivered to a subscriber 292 as that subscriber 292 sequences the menus.

Menus can be sent from the operations center 202 or another remote site and stored in the file server 215. The network manager 214 maintains an accurate list of the address locations for every standard menu stored in the file server 215. The address locations of the menus are stored in the network management databases 262. Thus, once a subscriber 292 selects a menu, the menu is spooled from its prestored location in the file server 215 and delivered to the individual subscriber 292 that requested the menu. In effect, the menu generation system anticipates the types of menus that the subscriber 292 will select for display. By prestoring each and every possible variation of the menus, the menus may be selected and spooled by the file server 215 in real-time. In this way, menus and submenus are sequenced in real-time based on subscriber input.

In the preferred system, the MPEG decoder 302 includes a buffer 300 capable of repeating frames of MPEG data. Thus, once a subscriber 292 chooses to view a new menu, this request is received 254 by the network manager 214, which prompts or instructs the file server 215 to select and spool the corresponding MPEG data frame or stream for that menu. Once the file server 215 has spooled the MPEG data, the frame for that menu is stored in buffer 300 and decoded by MPEG decoder 302 for subsequent distribution to the subscriber 292. While the subscriber 292 views or displays that menu, pondering the next menu or program selection, the buffer 300 repeatedly provides the MPEG decoder 302 with the same frame of MPEG data for that menu screen. In this way, the file server 215 is required to only once spool the MPEG data frame or stream for that menu until the subscriber 292 makes another selection. Similar buffering devices as described above may be used for MPEG data frames or streams that are destined for a digital set top terminal 700 so that the file server 215 is not required to continuously spool the same frames or streams of data.

b. Custom Menus

Generally, there are three preferred methods for customizing menus with the network manager: (i) text data embedded in analog signal, (ii) text data embedded in digital signal, and (iii) generated digital video data (which includes customized text in the video). To accomplish either of the first two methods, the network manager 214 processes a subscriber request and uses one or more look-up tables to generate text (for example to look up letters, words, program titles, lines of text, or blocks of text) located in a database 262. Alternatively, the network manager 214 may generate new text.

Once the network manager 214 has the desired text for a customized menu, it either sends the menu to a subscriber's set top terminal in an analog signal downstream (to an analog-capable set top terminal or output equipment), or digitizes and places the text into the private data packet format of MPEG2 or other digital video format (for a digital set top terminal or output equipment). If a set top terminal has the capability of overlaying text on video, then either an analog signal or digital signal containing the customized text data may be sent to the set top terminal 220. The set top terminal 220 can then overlay the customized text on a menu. In addition to the text data, the network manager 214 may have video for the background of the menu spooled to the set top terminal 220 (either with digital video data or an analog signal). Since set top terminals are not standardized (and vary not only from manufacturer to manufacturer but also from version to version), the text signal for providing text for overlaying on a video menu varies greatly from terminal to terminal. Therefore, although workable, it becomes burdensome for the network manager 214 (specifically the programmer of the network manager) to accommodate the different text signal needs for each set top terminal type. Further, the first two methods do not work for set top terminals 220 without text generation and overlaying ability.

However, it is easier and preferred that the cable headend 208 output equipment generate the menus with text overlays rather then the set top terminals 220. To accomplish this, the output equipment receives a standard text signal (either analog or digital) and generates the text overlay prior to transmitting video to the set top terminal. In this manner menus can be created at the output equipment in the same standard manner for all subscribers and sent as video programs to subscriber set top terminals 220. Specifically, the output equipment repeats MPEG frames and overlays text onto the analog video created. The network manager 214 need then send out only one type of standard text signal for custom menu overlays.

Figure 10A:
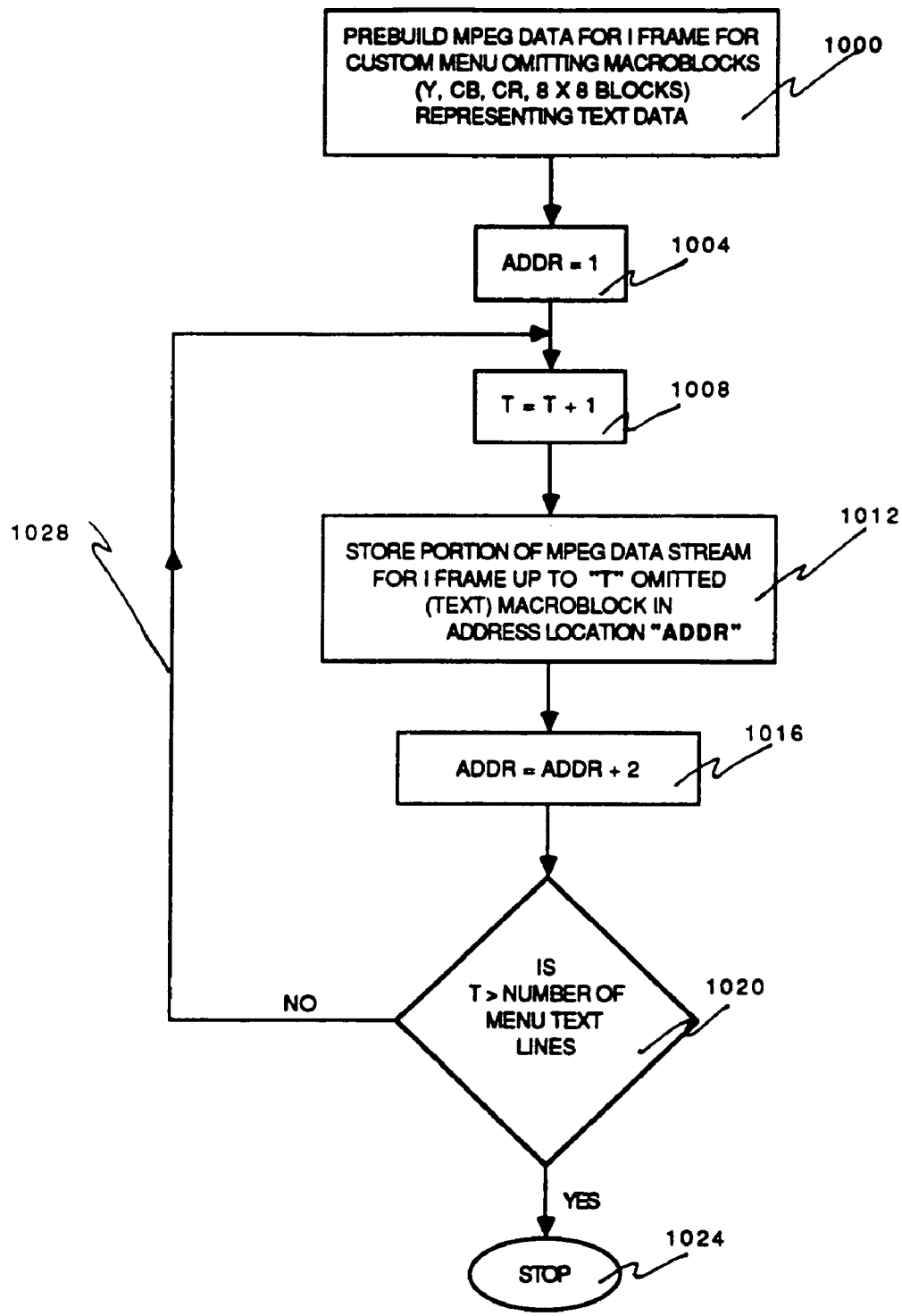
FIG. 10a is a diagram showing the steps in a method to prebuild an MPEG data stream for a customized menu.

Alternatively, method three, the generation of digital video data, may be used. The third method is preferred for some cable headend configurations because it lowers the cost of hardware required at the cable headend. To generate digital video data using this third method, the network manager 214 must prebuild and store in advance a digital video data stream which represents the background for a custom menu without the customized text (i.e., without the customized remaining portions of the custom menu). Then, upon receiving a subscriber request for a custom menu, the network manager 214, in real time, recalls the prebuilt digital video data stream from memory 262 and adds the necessary digital video data (within the data stream) that represents the customized text. The network manager 214 can, in effect, insert or interleave the generated text messages with the pre-built data streams in order to generate a customized menu screen in real time. FIG. 10a is a flow diagram for an example of the steps necessary to prebuild an MPEG data stream for a customized menu. The first step of the process is to prebuild an MPEG data stream for an I frame for the custom menu omitting only macroblocks (Y, Cb, Cr, 8X8 blocks) representing the customized text data 1000. This first step 1000 can be performed in various ways. For instance, a still video picture representing the customized menu with the text removed (or colored blocks inserted where the text should appear) may be processed through an MPEG encoder to obtain an MPEG data stream. Alternatively, the network manager or some other CPU can, through processing, build an MPEG data stream which represents a menu without text. Once this data stream has been obtained, the network manager is ready to properly store the MPEG data stream (without text video data) for later recall.

The next step in this process is to initialize an address variable equal to 1" (see block 1004). Following this initialization, the routine is prepared to iteratively store sections of the MPEG data stream text. This is shown by storage loop 1028. The next step is for a text counter "T" to be increased by one 1008. This is followed by the network manager storing a portion (or section) of the MPEG data stream for the I-frame up to the encountering of omitted text, (which is the first text in the first instance) 1012. The text counter counts the first or next piece of MPEG data which have been omitted (because the text macroblock has been omitted) when prebuilding the MPEG data stream for the I-frame. This portion of MPEG data up to the text is stored in the address location of the address variable (ADDR). Following the storing of this portion or section of the MPEG data stream, the address counter is incremented by two 1016. The purpose for incrementing the address counter by two (instead of incrementing by one) is to leave an open memory address available for the macroblocks representing the omitted text. In other words, memory space is left open for storing the text (the memory space will be used later to insert macroblocks representing the text).

Following this incrementing of the address location, the program determines whether it has exceeded the number of menu text lines on this particular customized menu 1020. If it has not exceeded the number of menu text lines, then the storage loop 1028 continues with the text counter being incremented 1008. A section or portion of the MPEG data stream in between the omitted text s stored in the address location which has already been incremented by two 1012. The addresses are then again incremented by two 1016.

Once the number of text lines has been exceeded, then the last portion of MPEG data has been stored. This last portion represents the MPEG data from the end of the last piece of text on the menu up to an through the last piece of MPEG data which represents the bottom right-hand corner of the menu screen. Thus, when the text number exceeds the number of menu text lines 1020, the program stops since the sections of the MPEG data stream which require being stored in advance are complete 1024.

Figure 10B:
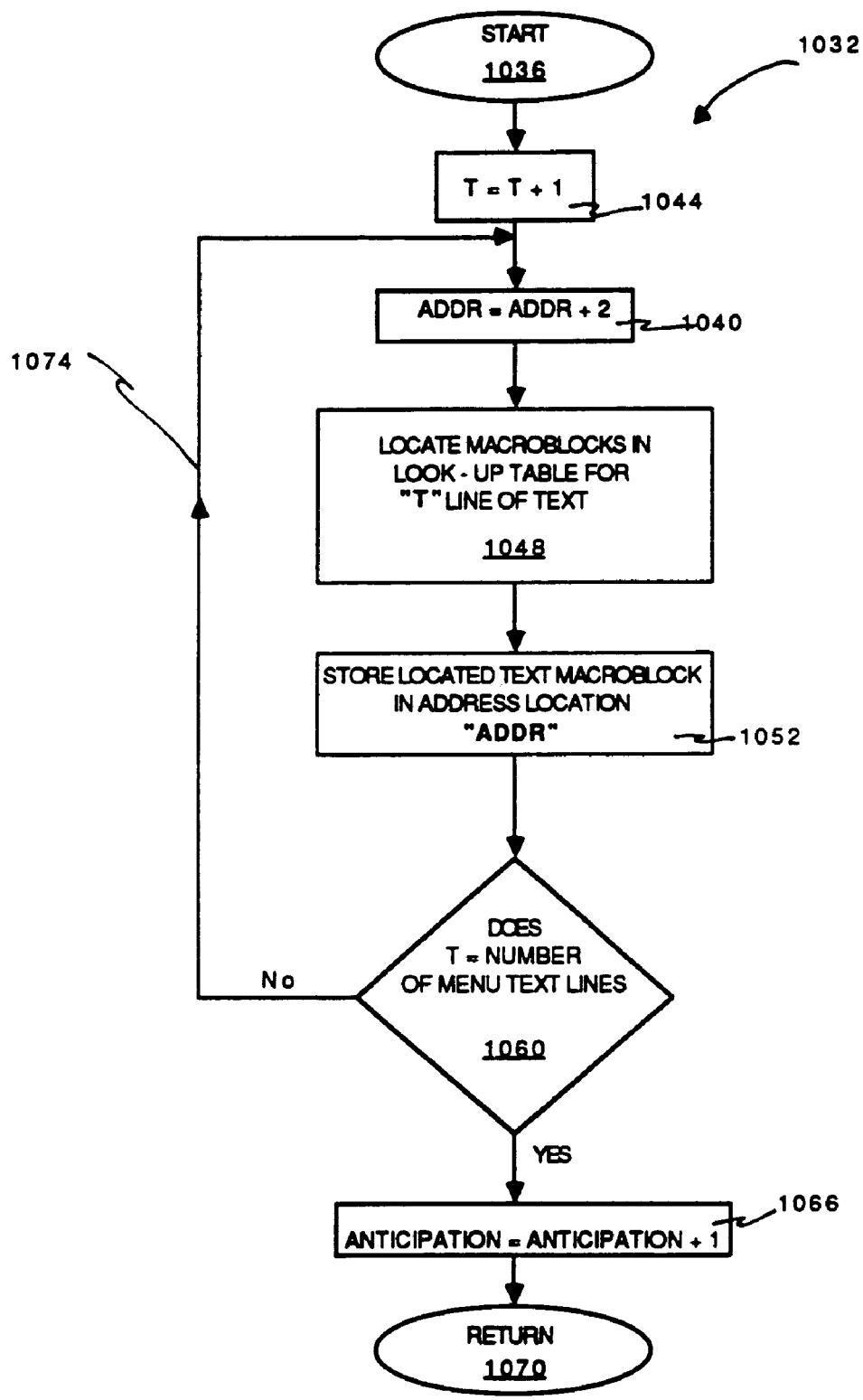
FIG. 10b is a diagram showing the steps in a method for creating or storing an MPEG data stream for a customized menu in real-time in response to a subscriber request.

FIG. 10b shows the creation or storing of a customized menu MPEG data stream in real-time in response to subscriber request 1032. After creation or storage, the MPEG data stream may be spooled to the requesting subscriber. This subroutine is started 1036 by a call from other subroutines within the network manager system. It begins by setting the address location (ADDR) equal to the address location (ADDR) plus two 1040. Next, the routine enters a loop which is repeated by the number of menu text lines 1074. The first item in the loop sets the text counter equal to the text counter plus one 1044, which increments the text counter. Block 1048 locates the macroblock in the look-up table for the "T" line of text 1048. Subsequently, the text macroblock is stored in address location ADDR 1052.

The number of menu text lines is checked to see if it is equal to the text counter 1060. If there are more lines of text remaining, the program continues through its loop 1074. If all the lines of text have been located and stored, then the program sets the anticipated menu variable to the anticipated variable plus one 1066 and returns 1070 to the routine in the network manager that called the subroutine 1032 to build custom menu MPEG data.

Locating macroblocks in a look-up table for the "T" line of text 1048 may be done in several ways. For example, the text may be stored in look-up table holding MPEG data representing blocks of MPEG data. These blocks of MPEG data may store MPEG data representing text by letter, worked, program title, line of text, block of text or other means. There are numerous ways in which these look-up tables may be built in advance to prestore data. The network management CPU may look up each piece of text (or text data) and place them together in order to form the T line of text. A loop can be established within block 1048 to repeatedly look up or locate data such as letters or words one at a time.

Figure 10C:
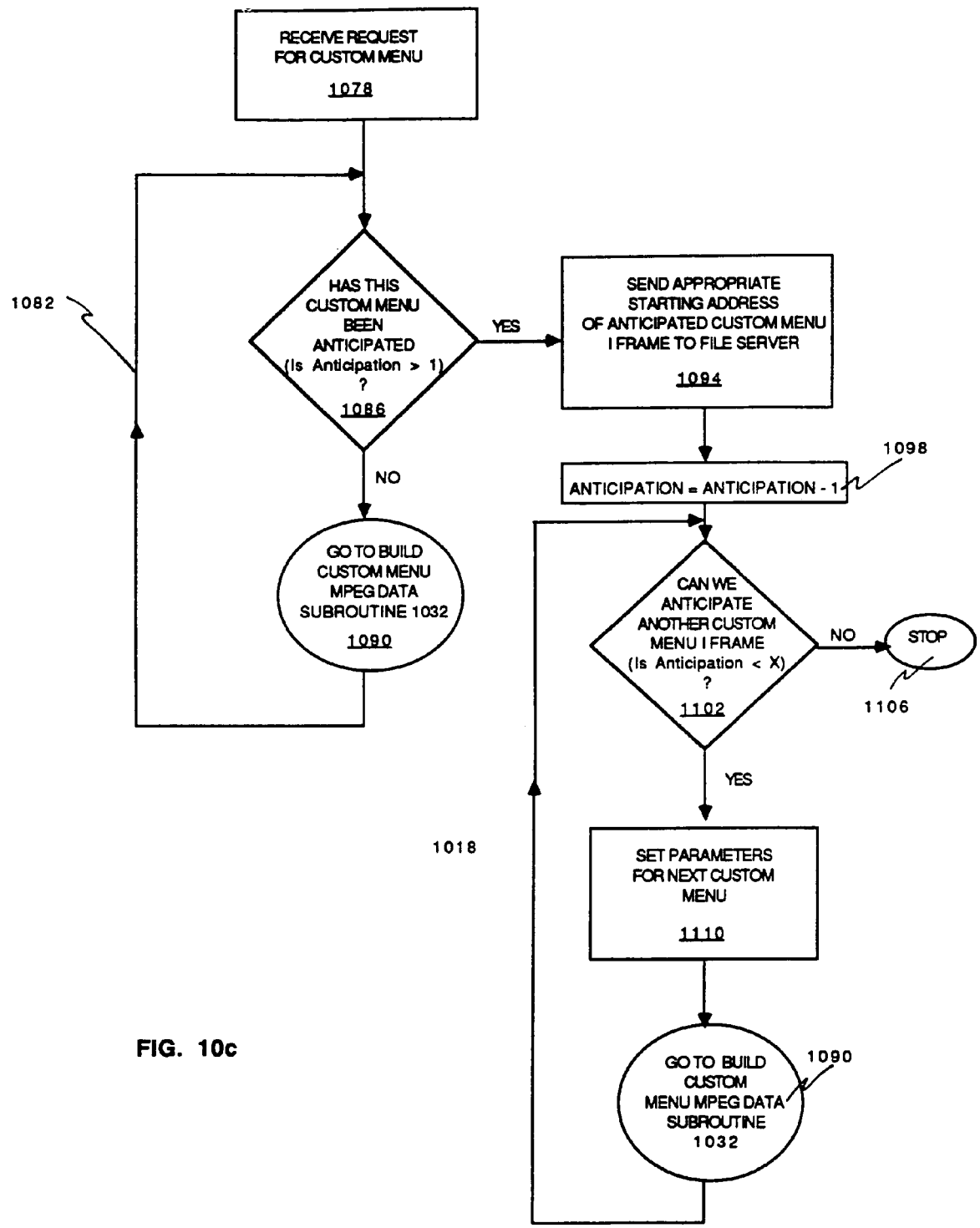
FIG. 10c is a diagram showing the steps in a method of processing a customized menu upon a request from a subscriber.

FIG. 10c shows one way in which the network manager may proceed in customizing menus upon request. First, the network manager receives a request for a custom menu 1078 from a subscriber set top terminal. After receipt, the network manager determines whether the custom menu has been anticipated and therefore has already been built and placed in storage 1086. Various steps and procedures can be used to determine whether a menu has been properly anticipated (such as a flag technique). If the anticipation flag variable is greater than a preset number (for example, one), then the custom menu has been anticipated. If the custom menu has not been anticipated, then the program proceeds to a routine which calls the Build Custom Menu MPEG Data subroutine 1090 and loops back 1082 to the determination block of whether or not the custom menu has been anticipated 1086.

If the custom menu has been properly anticipated and is already stored and ready to be sent to the subscriber, the appropriate starting address for the anticipated custom menu I-frame is sent to the file server 1094. Following this, the anticipation flag is appropriately decremented by one or some other method which allow the system to know whether the next custom menu has been anticipated or not for this subscriber request.

Following the sending of the menu and decrementing of the anticipation flag, the routine enters a loop 1018 which attempts to anticipate and build additional anticipated custom menus. To anticipate the next custom menu, many new custom menus may need to be created. First, the program must determine whether it is possible to anticipate another custom menu I-frame for the subscriber 1102. It may be possible for the processor to do this by analyzing the anticipation flag or other method. If it is not possible to anticipate another custom menu for this subscriber, then the routine stops 1106. However, if it is possible to anticipate additional custom menus for the subscriber, then the routine sets the parameters, including text parameters, for the next custom menu 1110 and proceeds to call the Build Custom Menu Data subroutine using call 1090. Once another custom menu MPEG data stream has been created, the program loops back 1018 to deciding whether it is possible to anticipate another custom menu 1102. This looping process continues 1018 until the system is not able to anticipate any further custom menus 1106.

FIGS. 10a, 10b and 10c show an example of how custom menus may be anticipated by the system, as many as 10 or 20 menus in advance, if necessary. Various methods of tracking whether custom menus have been anticipated may be used (such as various flag or counter techniques) with the custom menu system. Also, FIGS. 10a, 10b and 10c show how custom menus can be prebuilt with MPEG data streams for I-frames with all but the text being omitted. Then, in real-time, the data for the text can be added, inserted or interleaved within the MPEG data stream. The text may be added using various prebuilt look-up tables such as letter, worked, program title, line of text, or block of text, etc. The MPEG data streams may be stored at the network manager or in the file server. Viewing these figures, those skilled in the art will recognize many possible variations for custom building of menus using digital data.

In addition to video and text, customized voice and sound may be sent to subscribers. To accommodate this feature, the network manager can use various known voice or sound generating techniques. The network manager creates these audio signals and places them in the analog or digital audio portion of the signal that is sent to the subscriber. In this way, the network manager can "talk" to the subscriber by name and read a custom menu to the subscriber.

The custom menu feature can be combined with the targeting advertisement, interactive programs, and other capabilities to highly personalize screens and audio delivered to a particular subscriber.

5. Interactive Programs

The network manager 214 can coordinate, process and manager all subscriber communications received during an interactive program. As the subscriber is viewing an interactive program, the subscriber will be presented with a number of questions during the interactive program in which an answer from the subscriber 292 is required. (The question posed to the subscriber 292 during the interactive program may be generated and sent to the subscriber 292 using any of the spooling data methods, menu methods and/or text overlaying techniques described.) After a question has been posed to the subscriber 292, the subscriber 292 may input an answer to the question, which will be sent to the network manager 214 in the form of upstream data 246 from the subscriber 292. The network manager 214 may receive the subscriber's answer to the question either directly through its network manager receiver 254 or by monitoring subscriber 292 communications received by the authorization component 236. Once the network manager 214 has received the subscriber's communication and processed the communication to determine the appropriate response to the subscriber's answer, the network management CPU 260 will prompt or instruct the file server 215 to select and spool the appropriate MPEG data stream in order to send the response to the subscriber 292 in real-time.

In order to accomplish this function, the network manager 214, using the network manager control software 264, makes use of a look-up table that prestores all possible subscriber answers to interactive questions posed during an interactive program. In this way, the Interactive Program routine 305 is called by the program request routine 293 so that the request may be processed. The Interactive Program routine 305 uses the look-up table to anticipate responses to the subscriber's answers.

FIG. 11 illustrates a sample subscriber answer look-up table that may be used by the network manager 214 to perform this function. As shown in the figure, the left-most column indicates the number of the interactive program. The top row corresponds to the number of the question posed during a given interactive program. This table forms a matrix in which a specific program number (designated by row) and an interactive question (designated by columns) can be used to store a set of memory addresses corresponding to responses to the subscriber's answer to that question posed during that program. In the example shown in FIG. 11, eight separate interactive programs and ten questions during each program are shown. For each program number and corresponding question number, a set of two, three, four, or more responses (designated as A, B, C and D) can be identified for a particular question asked during a particular program.

In order to generate a response to the subscriber's answers in real-time and interactively, the network manager 214 processes and interprets the subscriber's answer by identifying the program number, the number of the question posed, and the subscriber's answer. Using this information, the network manager 214 identifies the corresponding prestored response to the subscriber's answer. Usually, the response is simply a memory address from which video or a menu may be spooled. Other types of more complex responses are also possible with this system.

Subsequently, the network manager 214 prompts or instructs the file server 215 to select and spool the corresponding response to the subscriber's answer. In so doing, the network manager 214 and the file server 215 can work together to select and spool the proper interactive response to the subscriber's answer and send the appropriate video or menu response to the subscriber 292 that has answered the interactive question. Although a look-up table is disclosed which prestores responses to subscriber answers, many other algorithms effectuating a response may be used with the network manager hardware.

6. NVOD

Near video on demand (NVOD) is a program delivery technique which makes use of a program displayed on multiple program channels where the program has staggered start times over the multiple channels. By staggering the start times of the program across multiple channels, a subscriber 292 may be presented with a menu that displays a number of programs which are available for NVOD selection. Once the subscriber 292 selects a particular program, the request is transmitted upstream 246 either directly to the network manager 214 or indirectly to the network manager 214 through the authorization component 236. In either event, the network manager 214 must determine the next available and nearest start time of the program to be displayed in order to accommodate the subscriber's 292 request.

The subscriber's 292 request is processed and the network management CPU 260 prompts or instructs the file server 215 to select and spool the appropriate data that can be sent to the set top terminal 220 in order for the set top terminal 220 to tune or switch to the proper channel displaying the program with the nearest start time. Thus, during processing, the network manager 214 generally: determines the channel with the next available staggered start time; compiles all requests that request the same program; and provides the determined channel and the compiled program requests to the file server 215 to locate the appropriate data to be sent to the subscribers. Various program preview techniques and menus may be used in an NVOD system.

7. VOD and VVOD

The network manager supports both VOD and VVOD at the cable headend. These are described in detail with reference to FIGS. 6a, 6b and 6c. VOD provides programs to the subscribers nearly instantaneously. VVOD gathers subscriber requests within minutes and efficiently allocates the subscriber requests (unbeknownst to the subscriber) to a specific channel. while the subscribers view a preview. The specific channel refers generically to a "channel" that may be either a program signal tuned to a specific 6 Mhz bandwidth or a "virtual channel" (which does not involve assignment of data or a signal to a particular segment of bandwidth).

In addition, the network manager supports operations center supplied VOD programs. Thus, when the file server does not contain the program requested, the network manager can request the program from the operations center. In response, the operations center (file server) spools the program requested by the subscriber. Then the network manager "relays" the program to the subscriber. To avoid delays to the requesting subscriber, the cable headend file server may store (in advance) and spool when needed the first few minutes of operations center supplied VOD programs. In this manner, the subscriber immediately receives the requested program and realizes no delay during the transaction between the network manager and the operations center. When the network manager receives the VOD program from the operations center, it seamlessly spools it out to the subscriber.

For a more detailed description of operations center VOD, see U.S. Ser. No. 08/352,204, filed Dec. 2, 1994, entitled AN OPERATIONS CENTER WITH VIDEO STORAGE FOR A TELEVISION PROGRAM PACKAGING AND DELIVERY SYSTEM, now U.S. Pat. No. 5,600,573, and incorporated herein by reference.

8. Program Suggestion

Using the standard and custom menu systems described above, the network manager can provide the subscriber with the program suggestion feature. This is accomplished using a sequence of menus from one of the menu systems in combination with the network manager CPU and associated instruction memory and databases. When requested, menus for the program suggestion feature are sent to the subscriber's set top. With this feature, programs or actors are suggested to a subscriber based upon historical data of the subscriber's previous programs watched, demographics or mood of the subscriber, other indicators, and/or by text word searches.

In the preferred program suggestion embodiment, text word searches of program preview information (such as program abstracts (descriptions), critics reviews and biographies about the actors) and/or program titles are performed by the network manager using databases in the network manager. Generally, personalized program or actor suggestions are made to the subscriber by obtaining information from the subscriber indicative of general subscriber interests. Subscriber entries are solicited from the subscriber preferably using program suggestion menus and submenus. The network manager uses these subscriber entries either directly or indirectly to search for programs or actors to suggest to the subscriber.

For the most part, the program suggestion methods may be categorized into two categories, either responsive methods (which respond to a series of subscriber menu entries), or intelligent methods (which analyze data to suggest a program). Using a responsive or intelligent method, the network manager determines a list of suggested titles or actors and creates a second or third menu (or submenu) to suggest the program titles for subscriber selection. Although standard menus may be generated in advance for many program suggestion menus, some customized menus are preferred in responding to specific subscriber requests or entries.

Responsive methods of suggesting program titles include, for example, the use of mood questions, searching for actors, and keyword searching. Using the instruction memory and menu generation hardware (such as CPU, file server, and databases) of the network manager, a series of mood questions can be presented on menus to determine a subscribers interest at a particular time. For this methodology, the operations center assigns each program title mood indicators (and subindicators) from a group such as light, serious, violent, short, long, dull, exciting, complex, easy-read, young theme, old theme, adventure, romance, drama, fiction, science-fiction, etc. These indicators are received from the operations center in the program control information signal. The indicators are displayed at the appropriate time on a menu to the subscriber. Based upon the subscriber menu entries, the network management CPU associates a set of indicators with the subscriber's request and a set of programs with matching assigned indicators are located for suggesting to the subscriber.

Responsive searches for actors or keywords (a search word provided by the subscriber) are generally performed by the network management CPU and instruction memory on data stored in the network manager's database. For example, a keyword given by the subscriber may be searched for a match in the database which stores the program reviews, critiques and program abstracts (descriptions). Thus, if a subscriber provided an entry of the word "submarine" on an appropriate standard or custom submenu, the title "Hunt For Red October" may be located by the network management CPU 260 using instructions from the Program Suggesting routine and/or instruction stored in the network manager instruction memory.

Intelligent methods of suggesting programs include analyzing personal profile data on the subscriber and/or historical data about the subscriber such as past programs watched or ordered by the subscriber (or buy data). This intelligent method is preferred in a VOD or VVOD system which easily stores programs watched or buy data in network manager database. The subscriber's set top terminal receives the menu (or menu data) including program suggestion information from the network manager (and if necessary generates the program suggestion menu or submenu as described above) and displays the menu). Software routines and algorithms stored in the network manager instruction memory are used to analyze historical data about the subscriber and program watched data to determine a line of programs to suggest to the subscriber. For example, if the subscriber usually watches half hour sitcoms about women, a menu listing the show "Designing Women" might be sent by the network manager to the subscriber's set top terminal.

The algorithm for this powerful feature of suggesting programs or actors to subscribers are disclosed in great detail in a co-pending application by the same inventor, U.S. Application Ser. No. 08/160,281, filed Dec. 2, 1993, and PCT/US93/11708 entitled REPROGRAMMABLE TERMINAL FOR SUGGESTING PROGRAMS OFFERED ON A TELEVISION PROGRAM DELIVERY SYSTEM, now U.S. Pat. No. 5,798,785, which is incorporated herein by reference.

The terms and descriptions used herein are set forth by way of illustration only and are not meant as limitations. Those skilled in the art will recognize that numerous variations are possible within the spirit and scope of the invention as defined in the following claims.

What is claimed is:

1. An apparatus for video on demand programs comprising:
   a receiver to receive requests for video on demand programs;
   a network manager, connected to said receiver, to process said program requests;
   an authorization component, connected to said network manager, to transmit a first authorization code, in response to a request for a video on demand program, to authorize a set top terminal to tune to a specific preview channel and to enable delivery of a requested program, wherein the specific preview channel does not provide the full video on demand program; and
   a file server, coupled to said network manager, to receive said first authorization code and send a second authorization code, wherein when the requested program is scrambled, the second authorization code enables descrambling said scrambled requested program, wherein said requested program is stored in the file server.

2. The apparatus of claim 1, wherein said network manager comprises a processor, connected to an instruction memory, to process said program requests.

3. The apparatus of claim 2, wherein said processor comprises control software to compile, group or count said program requests.

4. The apparatus of claim 1, wherein the network manager comprises a timer, wherein the network manager monitors program requests for a same program within a time period set by the time, and wherein set top terminals requesting the same program within the time period receive the requested same program.

5. The apparatus of claim 1, wherein said file server comprises process software to deliver or authorize to receive at least one requested program.

6. The apparatus of claim 1, wherein said requested program is stored in the file server in MPEG format.

7. The apparatus of claim 1, wherein said requests for video on demand programs are received from set top terminals.

8. The apparatus of claim 1, wherein said authorization component is connected to said network manager by an interface.

9. An apparatus for delivering video on demand programs to set top terminals comprising:
   (a) a receiver to receive request for video on demand programs from the set top terminals;
   (b) a network manager, connected to said receiver, comprising:
   a processor to process said program requests, wherein said processor includes an instruction memory and said processor comprises control software to compile, group or count said program requests;
   (c) an authorization component, connected to said network manager by an interface, to transmit a first authorization code, in response to a request for a video on demand program, to authorize the set top terminals to tune to a specific preview channel and to enable delivery of a requested program, wherein the specific preview channel does not provide the full video on demand program; and
   (d) a file server, connected to said network manager, to receive said first authorization code and send a second authorization code, wherein when the requested program is scrambled, the second authorization code enables descrambling said scrambled requested program, wherein said requested program is stored in the file server.

10. An apparatus for video on demand programs comprising:
an authorization component to receive requests for video on demand programs;
an interface connected to said authorization component;
a network manager, connected to said interface, to process said program requests; and
a file server, connected to said authorization component to (i) receive a first authorization code, generated in response to a request for a video on demand program, to authorize set top terminals to tune to a specific preview channel and to enable delivery of a requested program, wherein the specific preview channel does not provide the full video on demand program, and (ii) send a second authorization code, wherein when the requested program is scrambled, the second authorization code descrambles said scrambled requested program, wherein said requested program is stored in the file server.

11. The apparatus of claim 10, wherein said network manager comprises:
a processor, connected to an instruction memory, to process said program requests.

12. The apparatus of claim 11, wherein said processor comprises control software to compile, group or count said program requests.

13. The apparatus of claim 10, wherein said requests for video on demand programs are received from set top terminals.

14. The apparatus of claim 10, wherein said file server comprises process software to deliver or authorize to receive at least one requested program.

15. The apparatus of claim 11, wherein said file server comprises process software to deliver or authorize to receive at least one requested program.

16. The apparatus of claim 10, wherein said requested program is stored in the file server in MPEG format.

17. An apparatus for delivering video on demand programs to set top terminals comprising:
an authorization component to receive requests for video on demand programs from the set top terminals;
an interface connected to said authorization component;
a network manager, connected to said interface, comprising:
a timer, wherein the network manager monitors program requests for a same program within a time period extending from an initial request for a video on demand program; and
a processor to process said program requests, wherein said processor includes an instruction memory, and said processor comprises control software to compile, group or count said program requests; and
a file server, connected to said authorization component to (i) receive a first authorization code, generated in response to a request for a video on demand program, to authorize set top terminals to tune to a specific preview channel and to enable delivery of a requested program to all the set top terminals requesting the same requested program within the time period, and (ii) send a second authorization code to all the set top terminals requesting the same requested program within the time period, wherein when the requested program is scrambled, the second authorization code enables descrambling said scrambled requested program, wherein said requested program is stored in the file server.

18. The apparatus of claim 17, wherein said requested program is digital.

19. The apparatus of claim 17, wherein said requested program is stored in the file server in MPEG code.

20. A method for delivering video on demand programming comprising the steps of:
a) receiving a request for a video on demand program from a set top terminal;
b) processing at least one received request the processing further comprising:
counting a period of time extending from an initial request for a video on demand program,
monitoring for additional requests from additional set top terminals until said period of time expires, and
authorizing viewing or delivering of said requested program, after said period of time expires, for all the set top terminals requesting the same requested program within the time period;
c) sending a first authorization code to a file server, generated in response to a request for a video on demand program, to authorize set top terminals to tune to a specific preview channel and to enable set top terminals to receive a requested program, wherein said requested program is stored in the file server;
d) spooling said requested program from said file server; and
e) downloading a second authorization code to all the set top terminals requesting the same requested program within the time period, wherein when the requested program is scrambled, the second authorization code enables descrambling said scrambled requested program.

21. The method of claim 20, wherein said step of authorizing further comprises authorizing viewing of previews.

22. The method of claim 20, further comprising the step of:
compiling, grouping or counting all said program requests.

23. A method for delivering video on demand programming comprising the steps of:
a) receiving a request for a video on demand program from a set top terminal;
b) processing at least one received request;
c) sending a first authorization code to a file server, the first authorization code authorizing the set top terminal to tune to a specific preview channel, wherein the specific preview channel does not provide the full video on demand program, wherein said requested program is stored in the file server;
d) spooling said requested program from said file server; and
e) sending a second authorization code, wherein when the requested program is scrambled, the second authorization code enables descrambling said scrambled requested program.

* * * * *

UNITED STATES PATENT AND TRADEMARK OFFICE
CERTIFICATE OF CORRECTION

PATENT NO. : 7,343,614 B1
APPLICATION NO. : 09/285249
DATED : March 11, 2008
INVENTOR(S) : John S. Hendricks et al.

It is certified that error appears in the above-identified patent and that said Letters Patent is hereby corrected as shown below:

Column 23, line 29 (approx.), delete "NOVD" and insert instead --NVOD--; line 33 (approx.), delete "Manger" and insert instead --Manager--.

Column 24, line 20, after "subscriber" delete "292" and delete "an analog" and insert instead --a digital--; line 61, delete "it" and insert instead --its--.

Column 25, line 46, delete "programs," and insert instead --programs--; line 62, delete "slits" and insert instead --slots--.

Column 26, line 8, delete "programs" and insert instead --program--.

Column 27, line 16, delete "program" and insert --programs--.

Column 29, line 3, after "example" insert --,--; line 57, delete "the" and insert instead --that--.

Column 30, line 11, before "1" insert --"--; line 20, delete "have" and insert instead --has--; line 38, delete "s" and insert instead --is--; line 44, delete "an" and insert instead --and--.

Column 31, line 7, delete "table" and insert instead --tables--; line 10, delete "worked," and insert instead --word,--; line 38, delete "allow" and insert instead --will--.

Column 32, line 5, delete "worked," and insert instead --word,--; line 26, delete "manager" and insert instead --manage--; line 30, delete "required." and insert instead --requested.--.

Column 34, line 2, delete "channel." and insert instead --channel--.

Column 35, line 33, delete "Suggesting" and insert instead --Suggestion--; line 34, delete "instruction" and insert instead --instructions--; line 46, delete "menu)." and insert instead --menu.--; line 54, delete "algorithm" and insert instead --algorithms--.

Column 36, line 48 (approx.), in claim 9, delete "request" and insert instead --requests--.

Column 37, line 11, in claim 10, delete "component" and insert instead --component,--;

line 56, in claim 17, delete "component" and insert instead --component,--.

Signed and Sealed this

Ninth Day of March, 2010

David J. Kappos
*Director of the United States Patent and Trademark Office*